Oct. 13, 1953  O. V. DUTRO ET AL  2,655,098
PRINTING, PUNCHING, AND CUTTING MACHINE
Filed Aug. 22, 1950  19 Sheets-Sheet 6
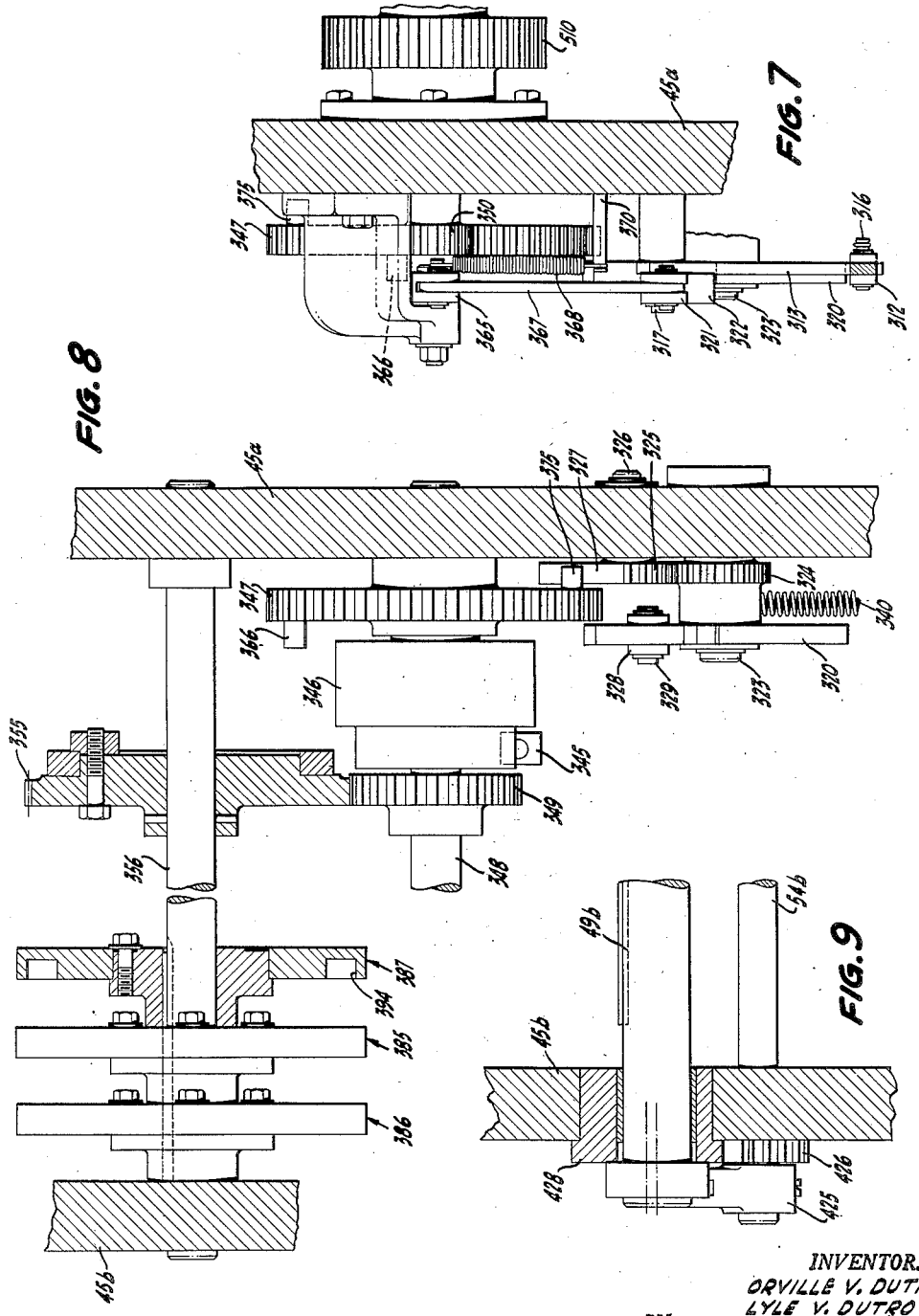
INVENTORS
ORVILLE V. DUTRO
LYLE V. DUTRO
JAMES F. NAMETH
BY
ATTORNEYS

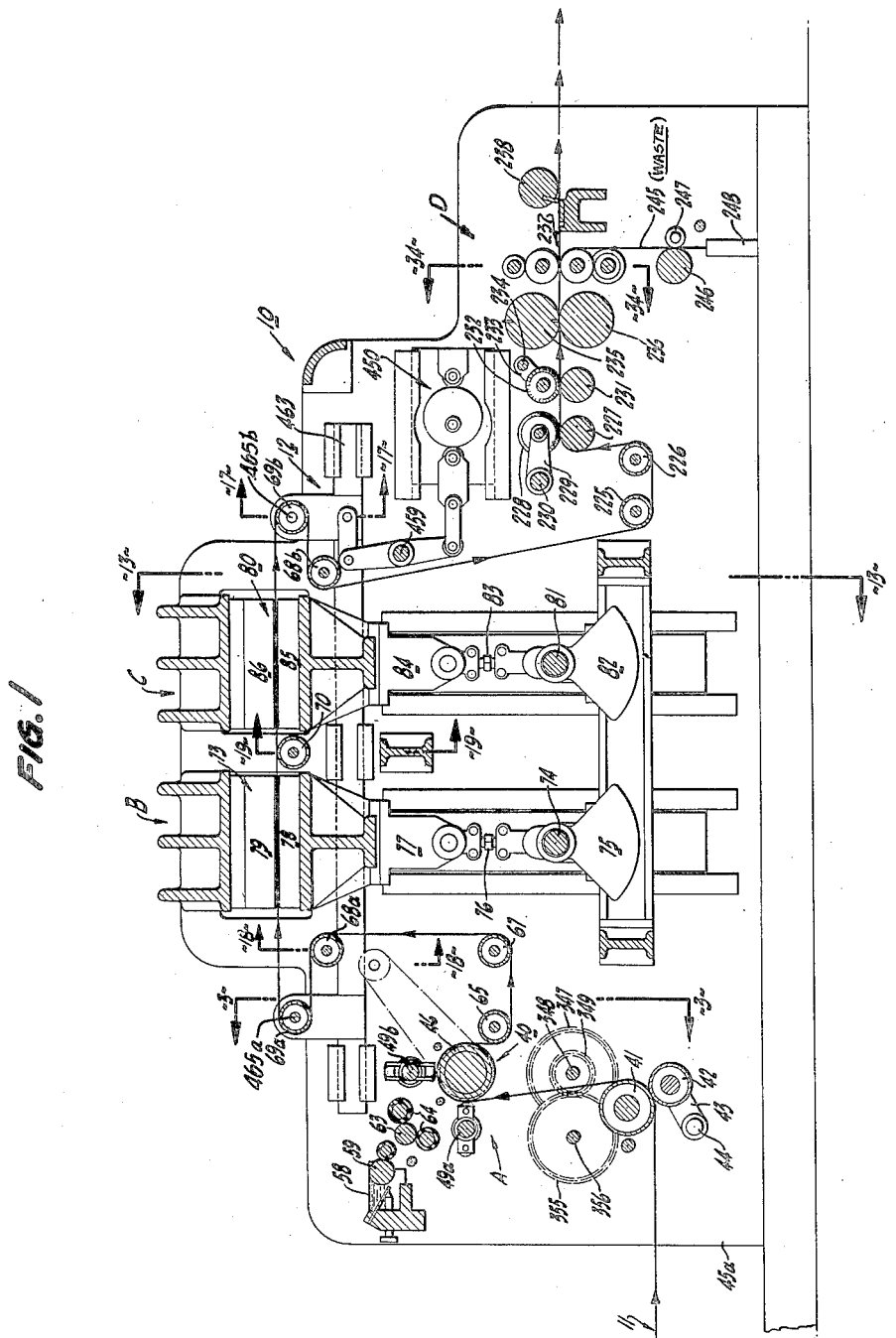

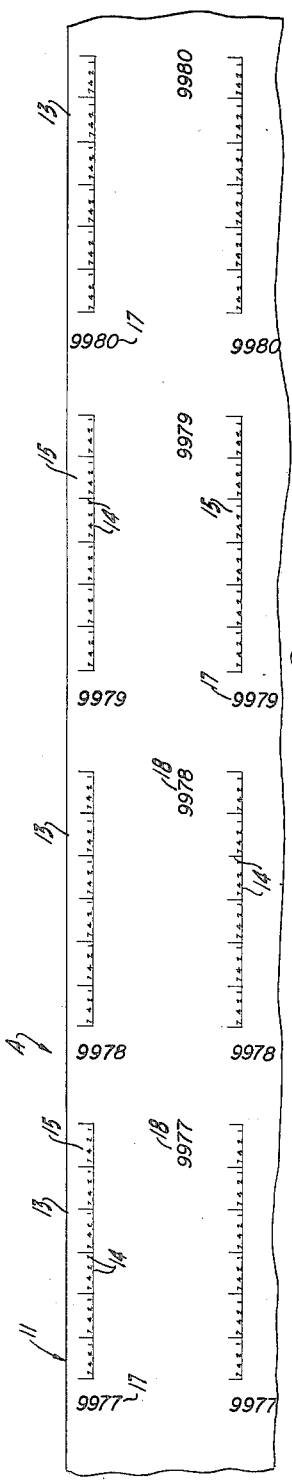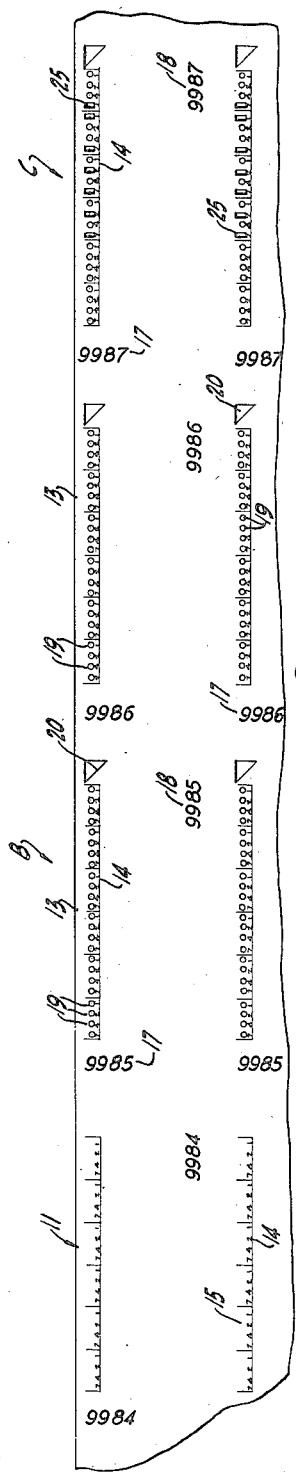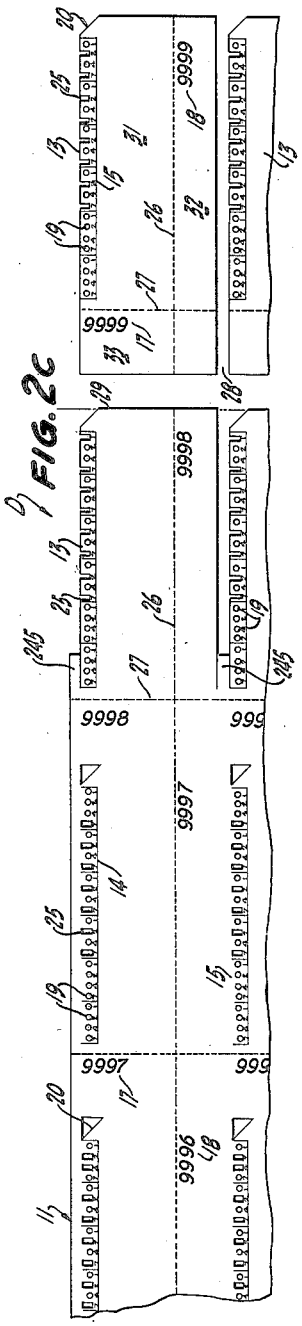

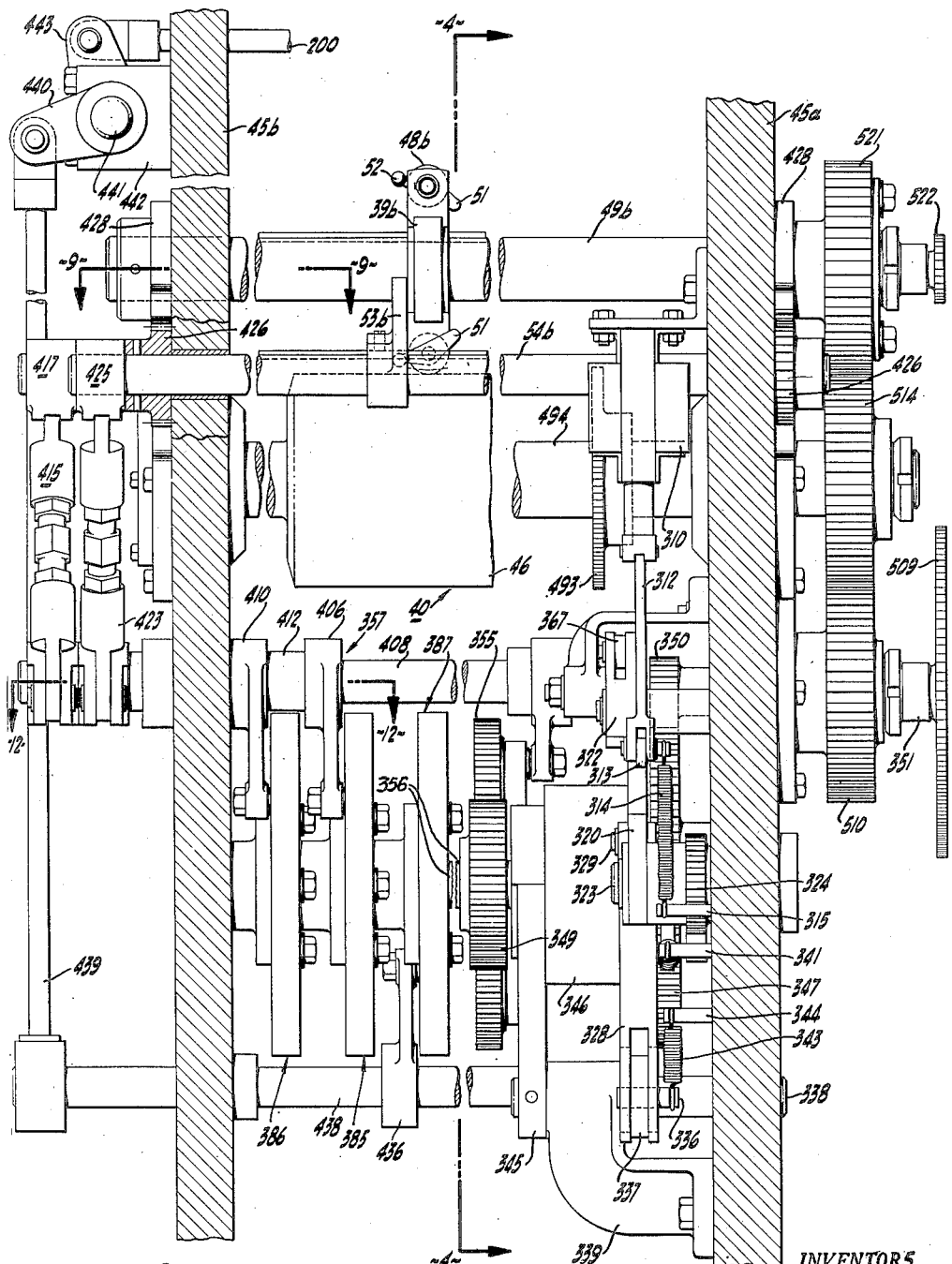

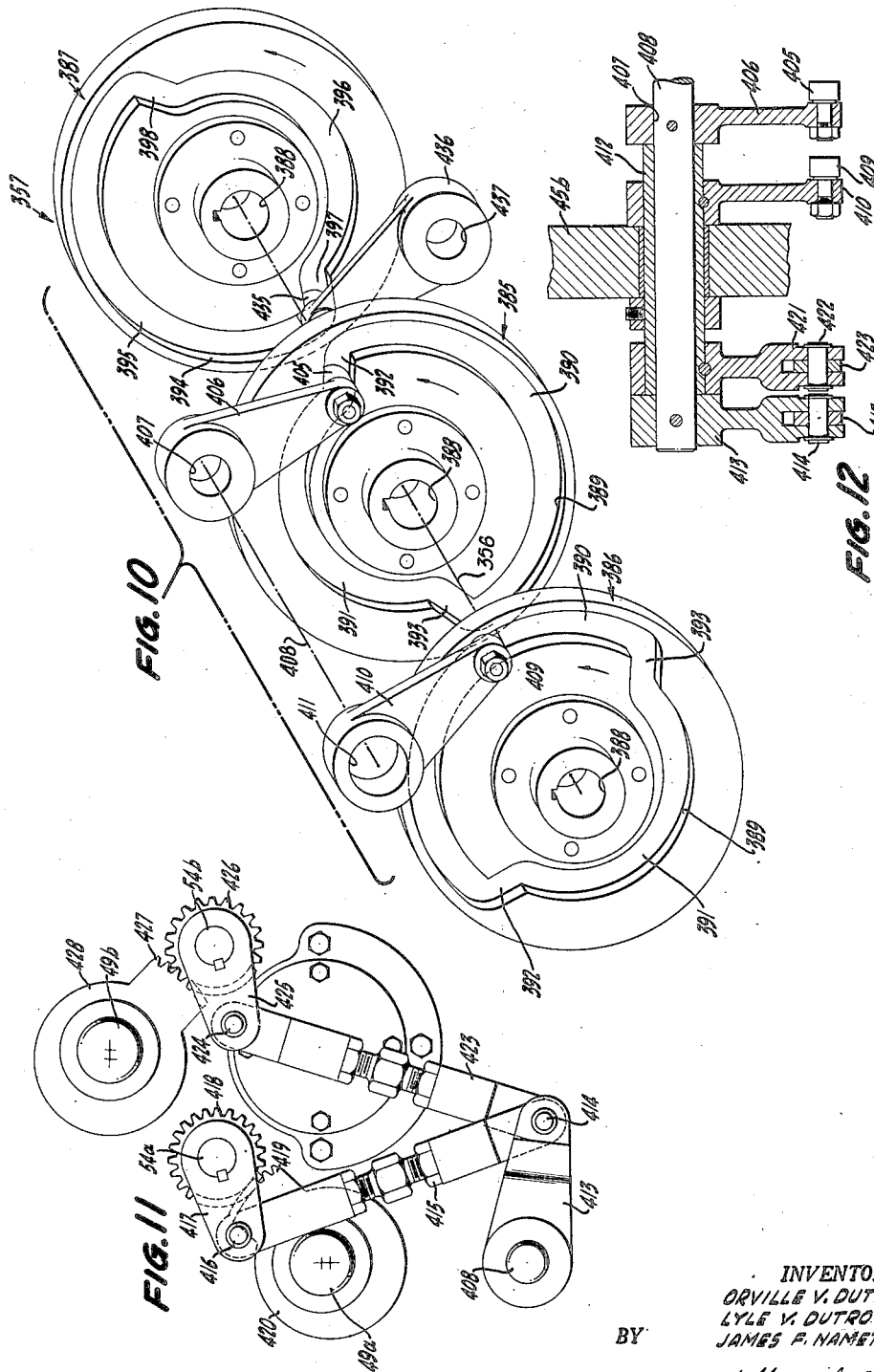

Oct. 13, 1953     O. V. DUTRO ET AL     2,655,098
PRINTING, PUNCHING, AND CUTTING MACHINE
Filed Aug. 22, 1950     19 Sheets-Sheet 8

INVENTORS
ORVILLE V. DUTRO
LYLE V. DUTRO
JAMES F. NAMETH
BY
ATTORNEYS

Oct. 13, 1953

O. V. DUTRO ET AL 2,655,098

PRINTING, PUNCHING, AND CUTTING MACHINE

Filed Aug. 22, 1950

INVENTORS
ORVILLE V. DUTRO
LYLE V. DUTRO
JAMES F. NAMETH

BY

*Mellin and Hanson*
ATTORNEYS

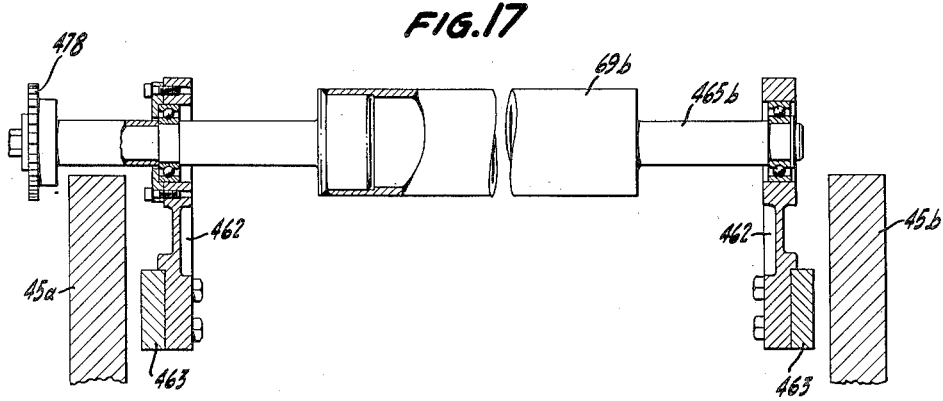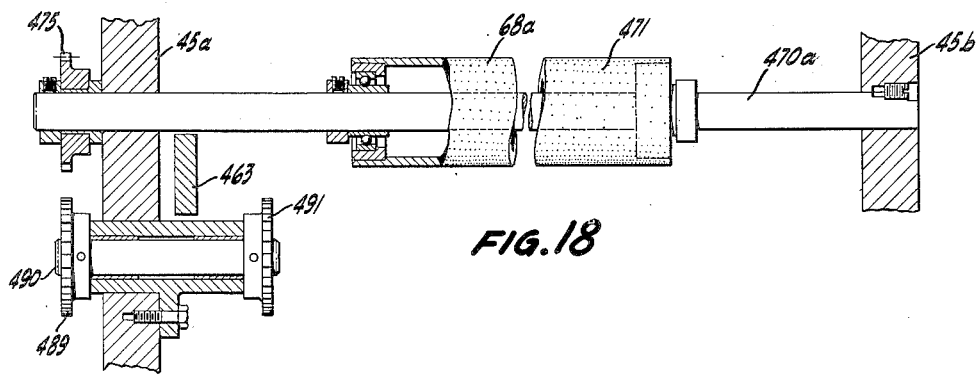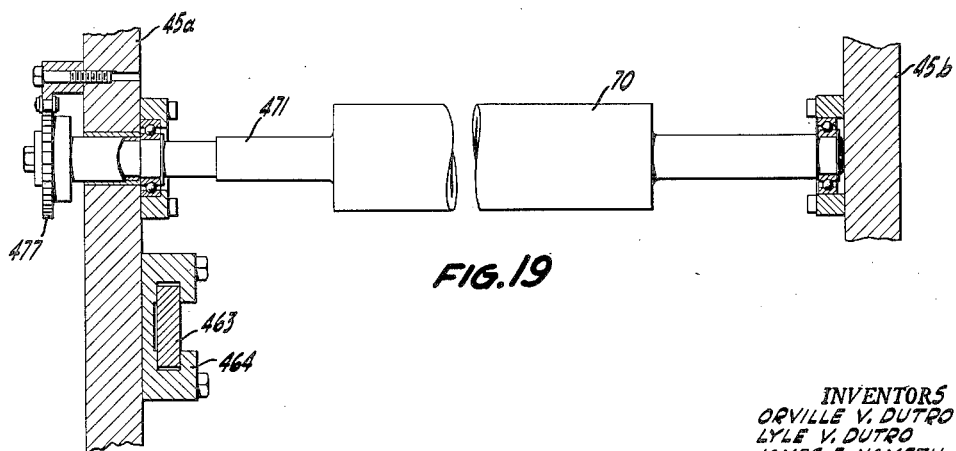

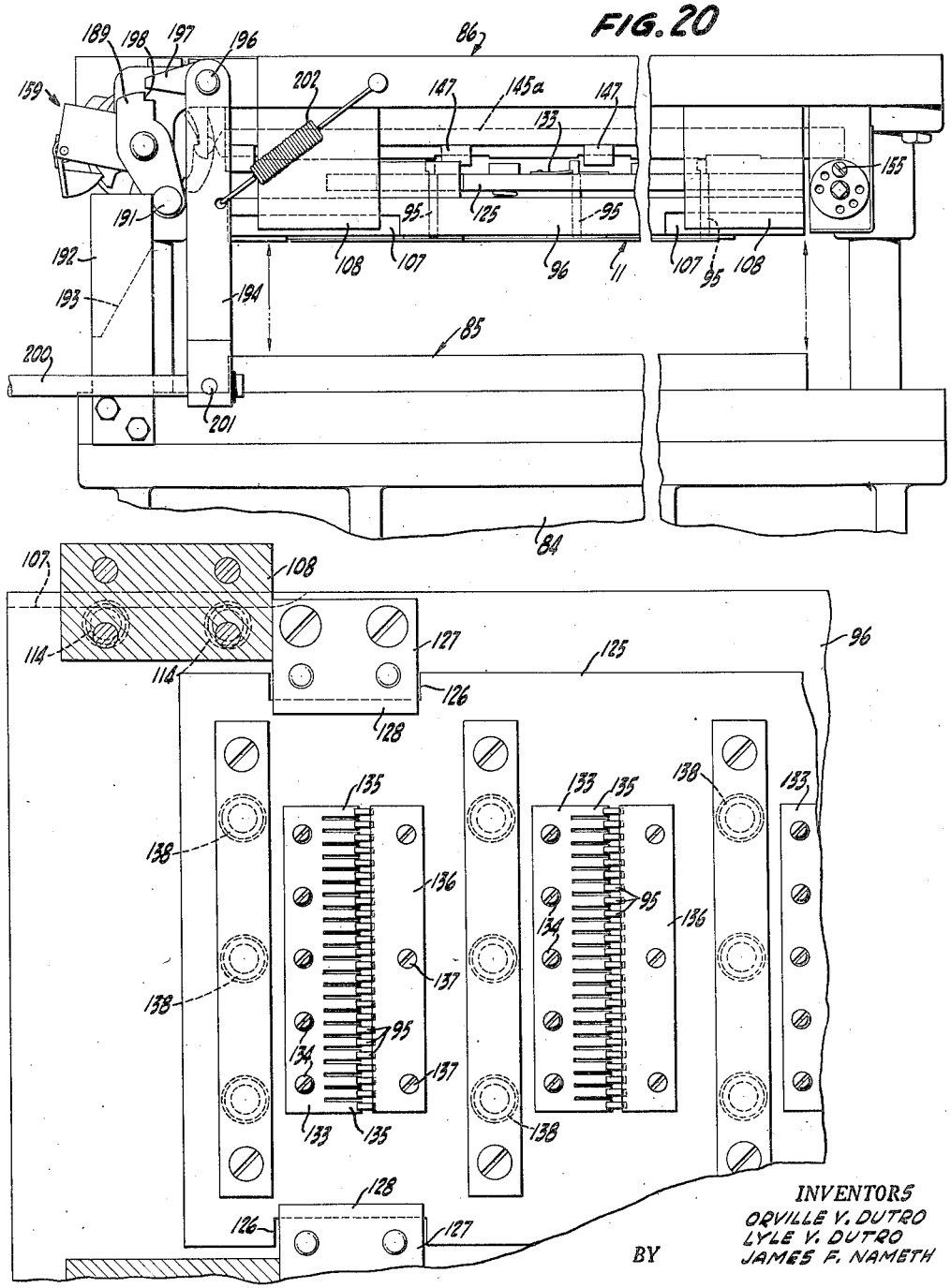

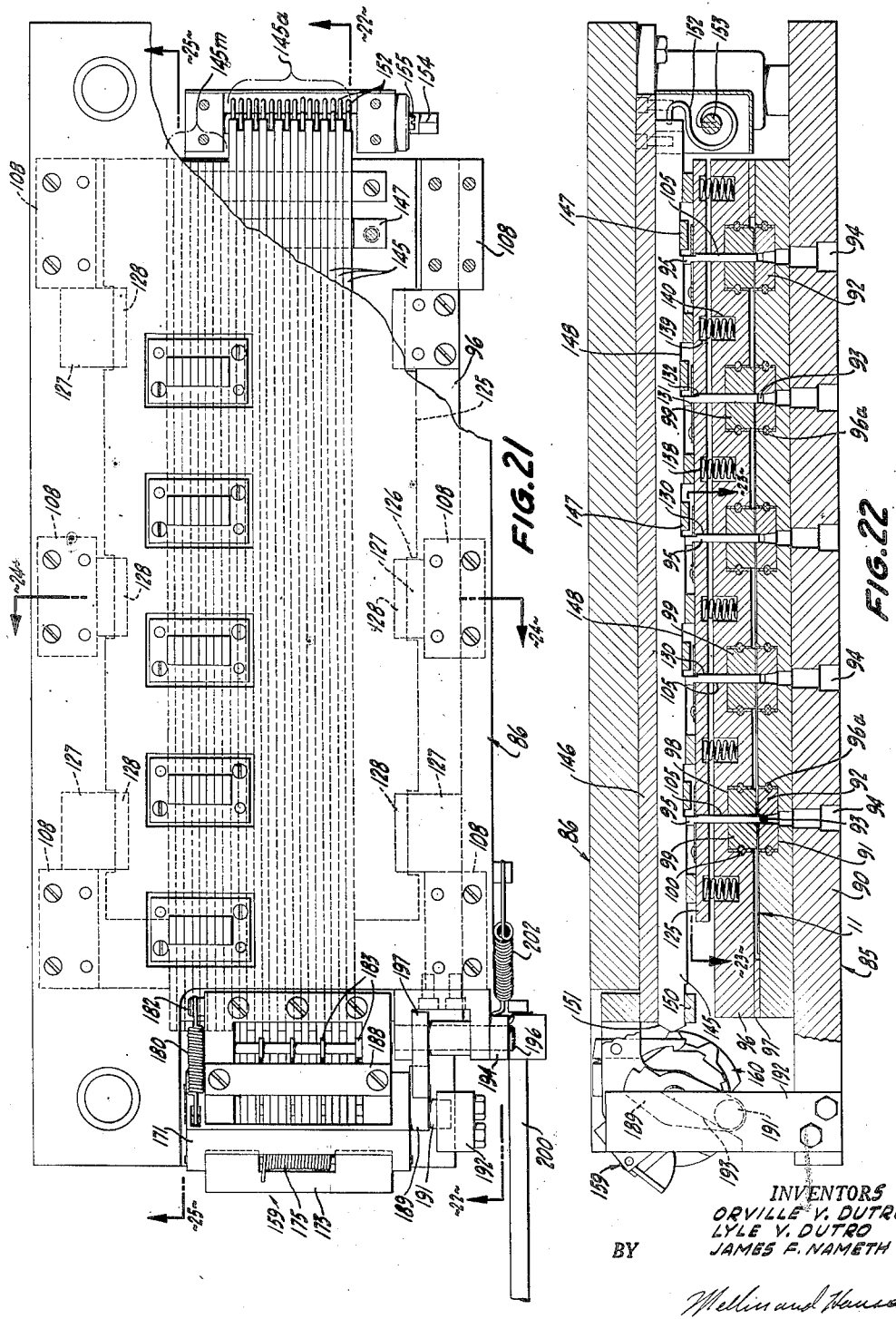

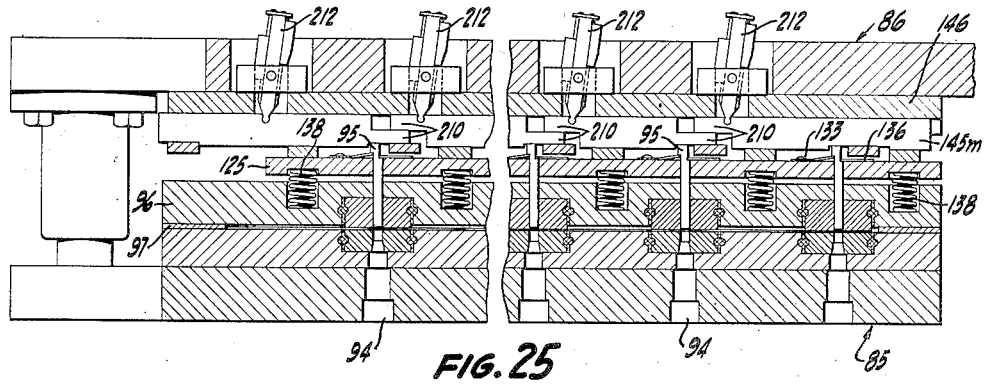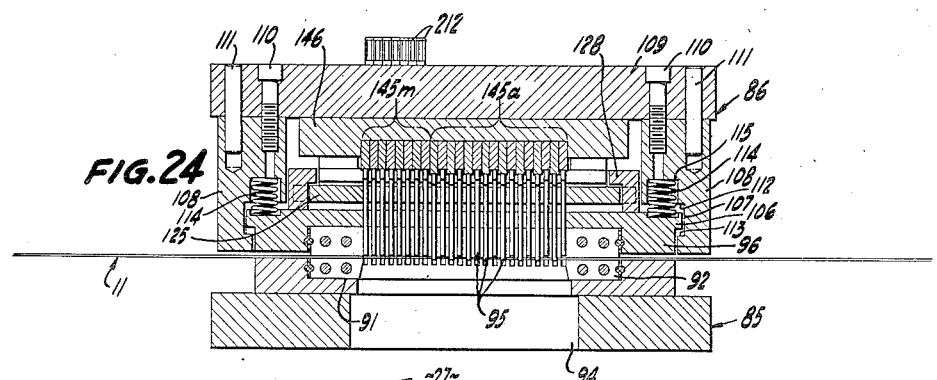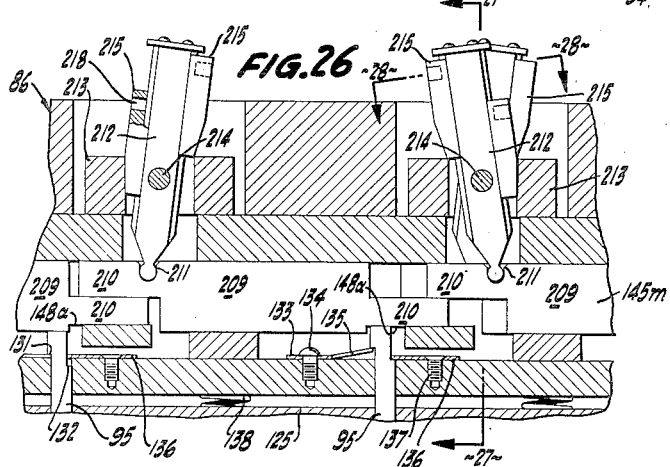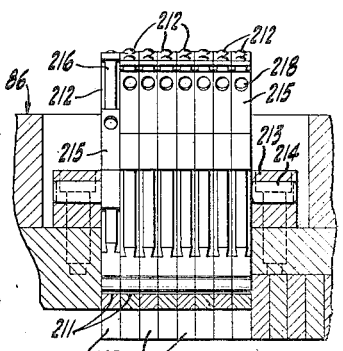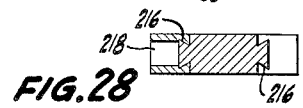

Oct. 13, 1953     O. V. DUTRO ET AL     2,655,098
PRINTING, PUNCHING, AND CUTTING MACHINE
Filed Aug. 22, 1950     19 Sheets-Sheet 15
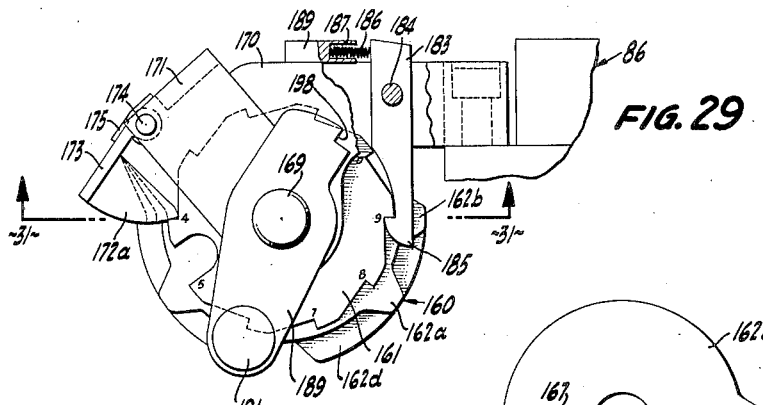
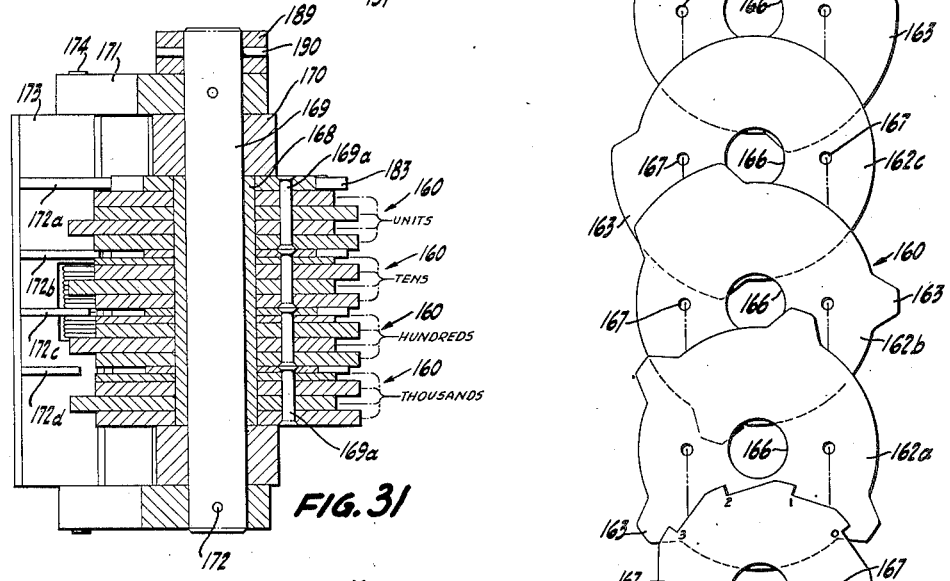
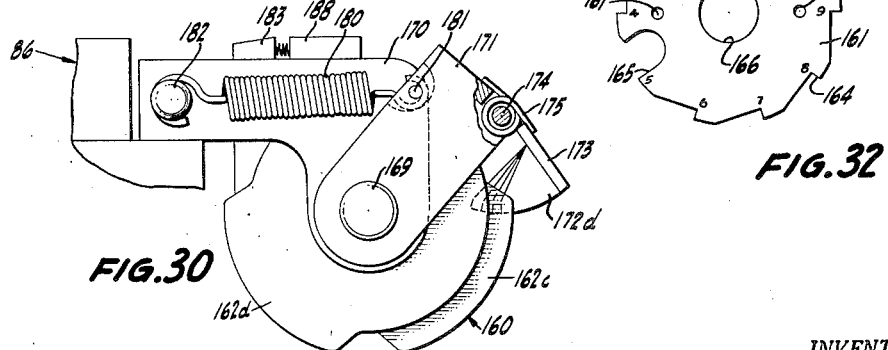
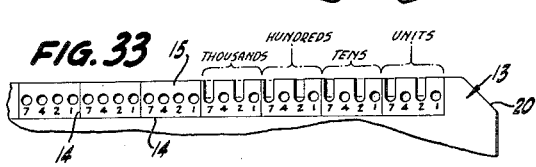
INVENTORS
ORVILLE V. DUTRO
LYLE V. DUTRO
JAMES F. NAMETH
BY
ATTORNEYS

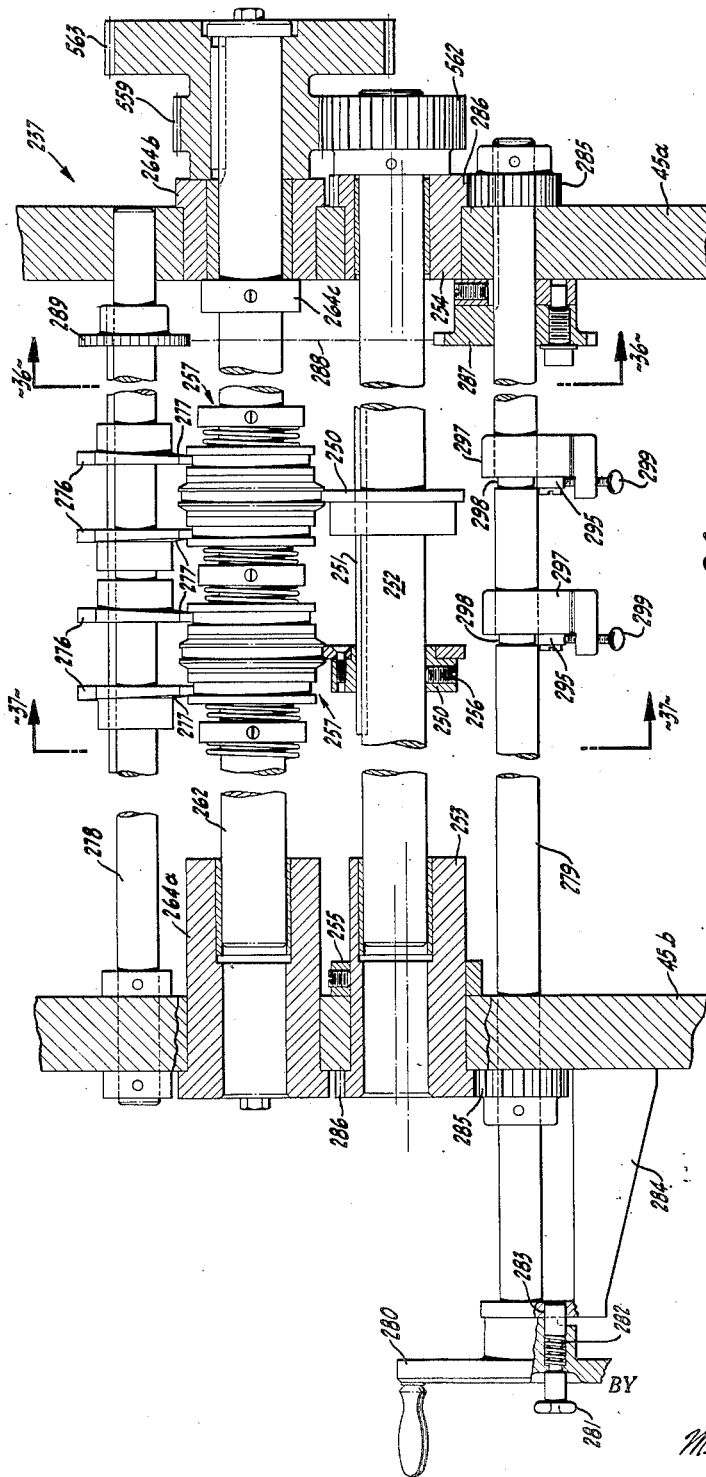

Oct. 13, 1953  O. V. DUTRO ET AL  2,655,098
PRINTING, PUNCHING, AND CUTTING MACHINE
Filed Aug. 22, 1950  19 Sheets-Sheet 17

INVENTORS
ORVILLE V. DUTRO
LYLE V. DUTRO
JAMES F. NAMETH
BY
Mellin and Hanscom
ATTORNEYS

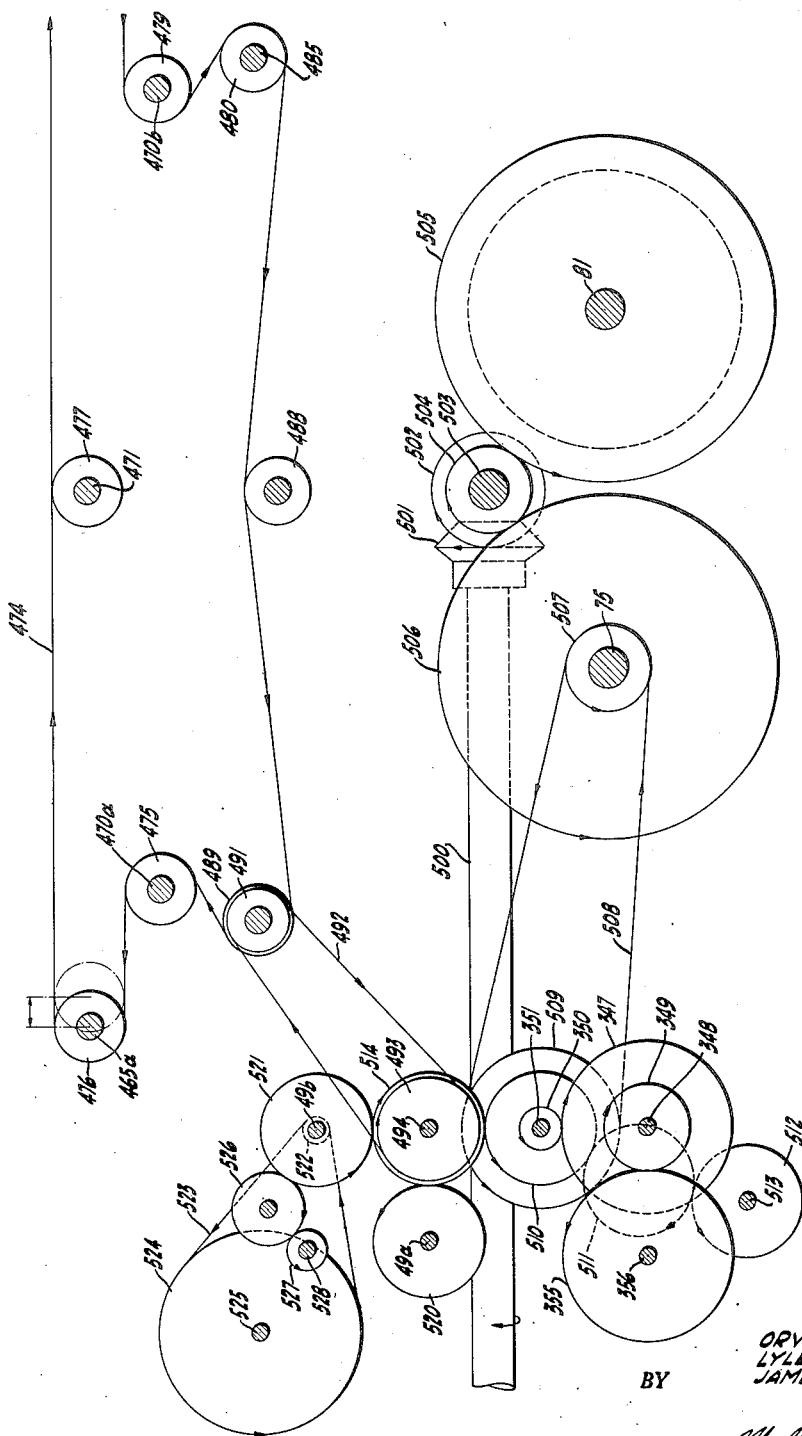

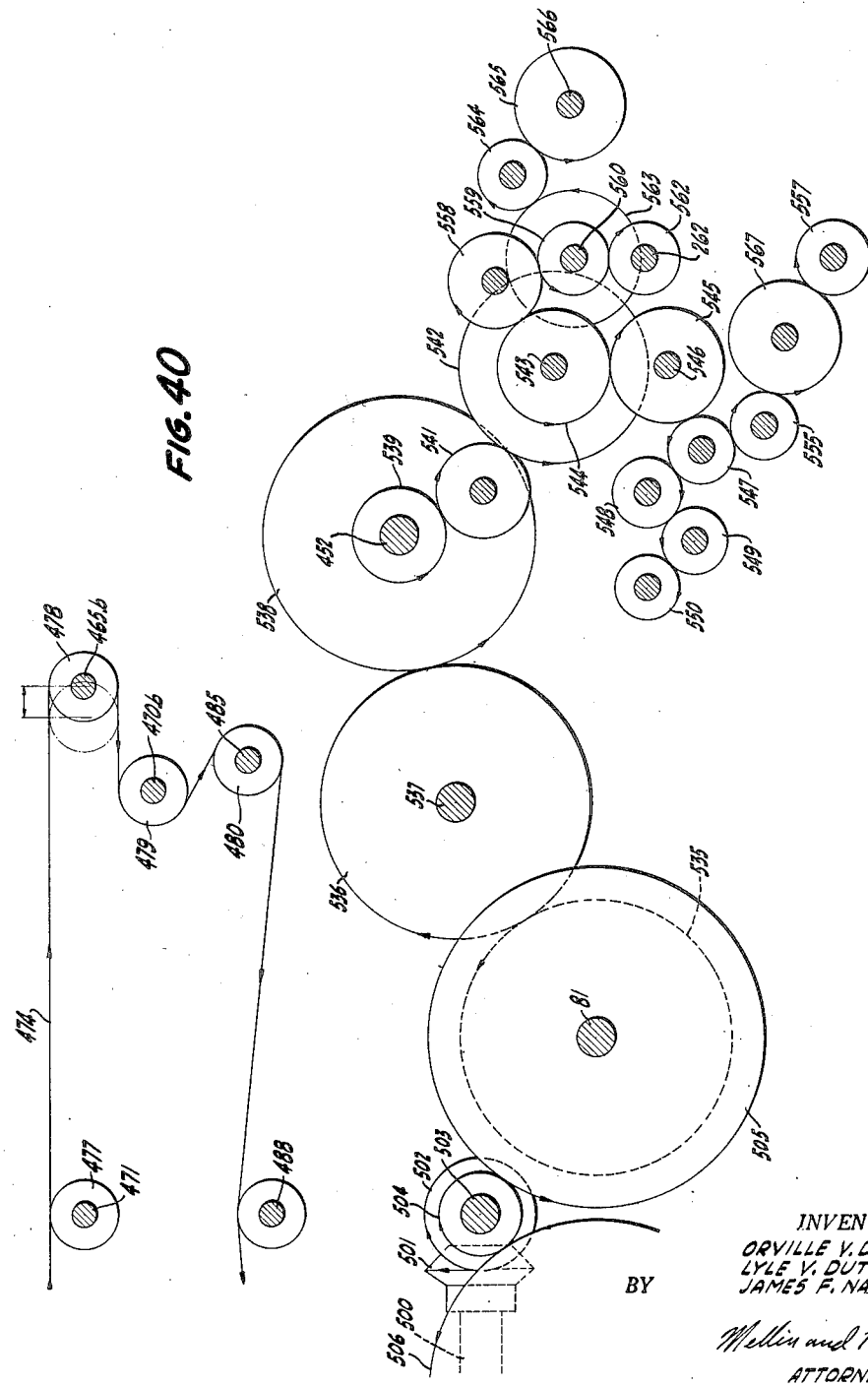

Patented Oct. 13, 1953

2,655,098

UNITED STATES PATENT OFFICE 2,655,098

PRINTING, PUNCHING, AND CUTTING MACHINE

Orville V. Dutro and Lyle V. Dutro, La Canada, and James F. Nameth, Los Angeles, Calif., assignors to The McBee Company, Athens, Ohio, a corporation Application August 22, 1950, Serial No. 180,832

12 Claims. (Cl. 101—19)

This invention relates to a press for producing marginally perforated record cards and the like. More particularly it relates to a press adapted to receive a continuous, printed web having record cards such as the well-known "Keysort" cards imprinted thereon; to print each card with a serial number; to punch each card to provide sequential marginal perforations within a card; to notch each card to code it with the same serial number as is printed thereon, and to shear and trim the web to produce individual cards.

In record and statistical cards such as the well-known "Keysort" cards, each card is provided with perforations along one or more of its edges. These perforations are divided into fields corresponding to units, tens, hundreds, etc., and they may be arranged in a single row or in double rows. By appropriately notching and/or slotting the perforations the cards are coded and may thereafter be classified and sorted on accounting machines in accordance with the information coded therein by the notching and slotting.

It is advantageous in many instances to provide a batch or lot of cards, each of which has imprinted thereon a serial number and is also notched or slotted to correspond to the printed number. Thus, in filling an order for, say 50,000 cards, it may be desirable to number these cards serially from 0 to 49,999 and to acomplish this numbering by both printing and notching.

It is an object of the present invention to provide a machine which is adapted to receive a continuous printed web having cards imprinted thereon, to number each card serially by printing means, to punch marginal perforations in each card, to notch or slot each card, to code its serial number and to shear and trim the web to produce individual cards.

It is a further object of the invention to provide a machine including a printing station having a first rotary printing means and a second rotary printing means arranged to successively print on a moving web, a punching station having punching means for punching through the web, a rotary operating means adapted to receive the web from the punching station and perform an operation on the web while the web is moving, means for continuously feeding the web through the printing station to and through the punching station in an intermittent advancing manner and then continuously through said rotary operating means, and means for inactivating the first rotary printing means and then after a predetermined lapse of time inactivating the second rotary printing means, and then after a further predetermined lapse of time inactivating the punching means.

These and other objects of the invention will be apparent from the ensuing description and the appended claims.

One form which the invention may assume is exemplified in the following description and illustrated by way of example in the accompanying drawings in which:

Figure 1 is a view of the machine in its entirety, being a longitudinal section taken along the center line of the machine.

Figures 2A, 2B and 2C are fragmentary diagrammatic views of the web as it proceeds through the machine, illustrating the various operations performed on the web by the machine.

Figure 3 is a section taken along the line 3—3 of Figure 1, being a transverse section through the machine showing the printing numbering assembly and also the kickout or time delay mechanism in end elevation.

Figure 4:
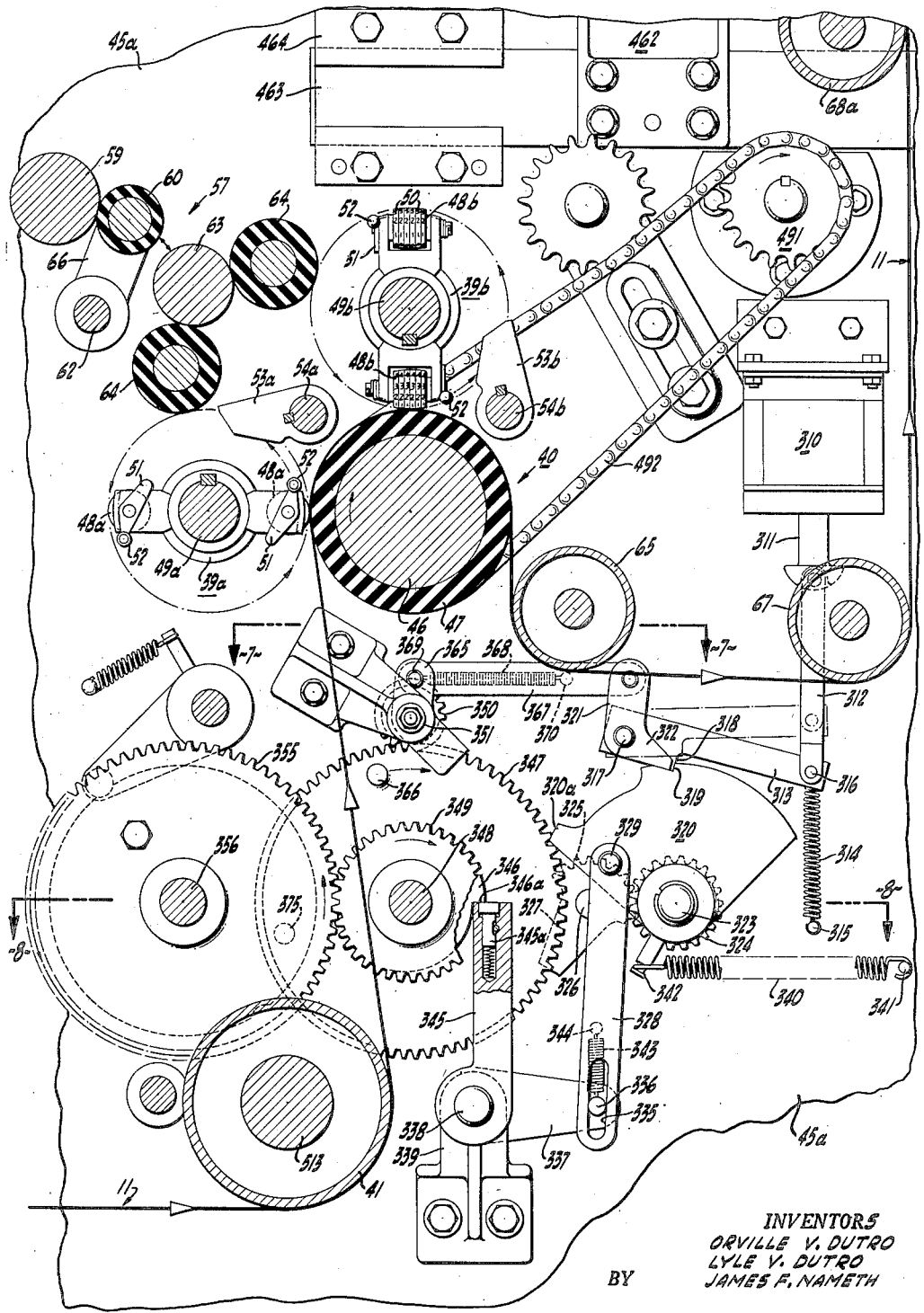
Figure 4 is a section taken along the line 4—4 of Figure 3 showing certain details of the numbering assembly for printing serial numbers on the cards, and also showing certain details of the kickout or time delay mechanism which is employed to terminate operation of the numbering assembly and of the notching assembly in properly timed relationship.

Figures 7 and 8 are sections taken along the line 7—7 and 8—8, respectively, of Figure 4 showing certain details of the kickout mechanism.

Figure 9 is a section taken along the line 9—9 of Figure 3 showing the accentric mounting of one of the numbering shafts which form part of the numbering assembly.

Figure 10 is an exploded perspective view of the cam assembly for operating the kickout mechanism.

Figure 11 is a view in elevation as seen from the left-hand side (as viewed in Figure 3) or the works side of the machine, showing certain operating elements of the kickout mechanism.

Figure 12 is a section taken along the line 12—12 of Figure 3 through the cam follower shaft of the kickout mechanism.

Figure 13:
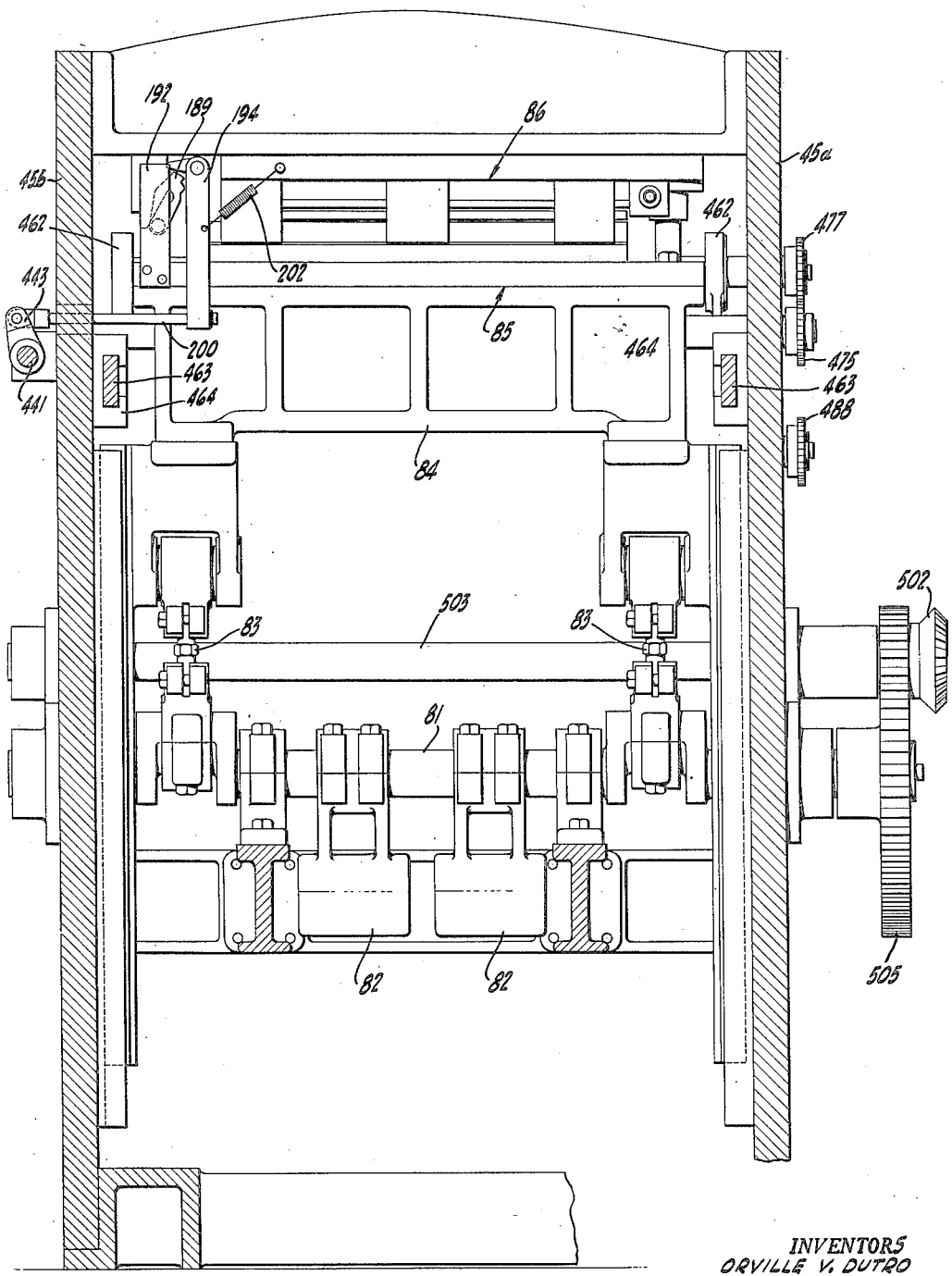

Figure 13 is a transverse section taken along the line 13—13 of Figure 1, showing the notching assembly in end elevation.

Figure 14:
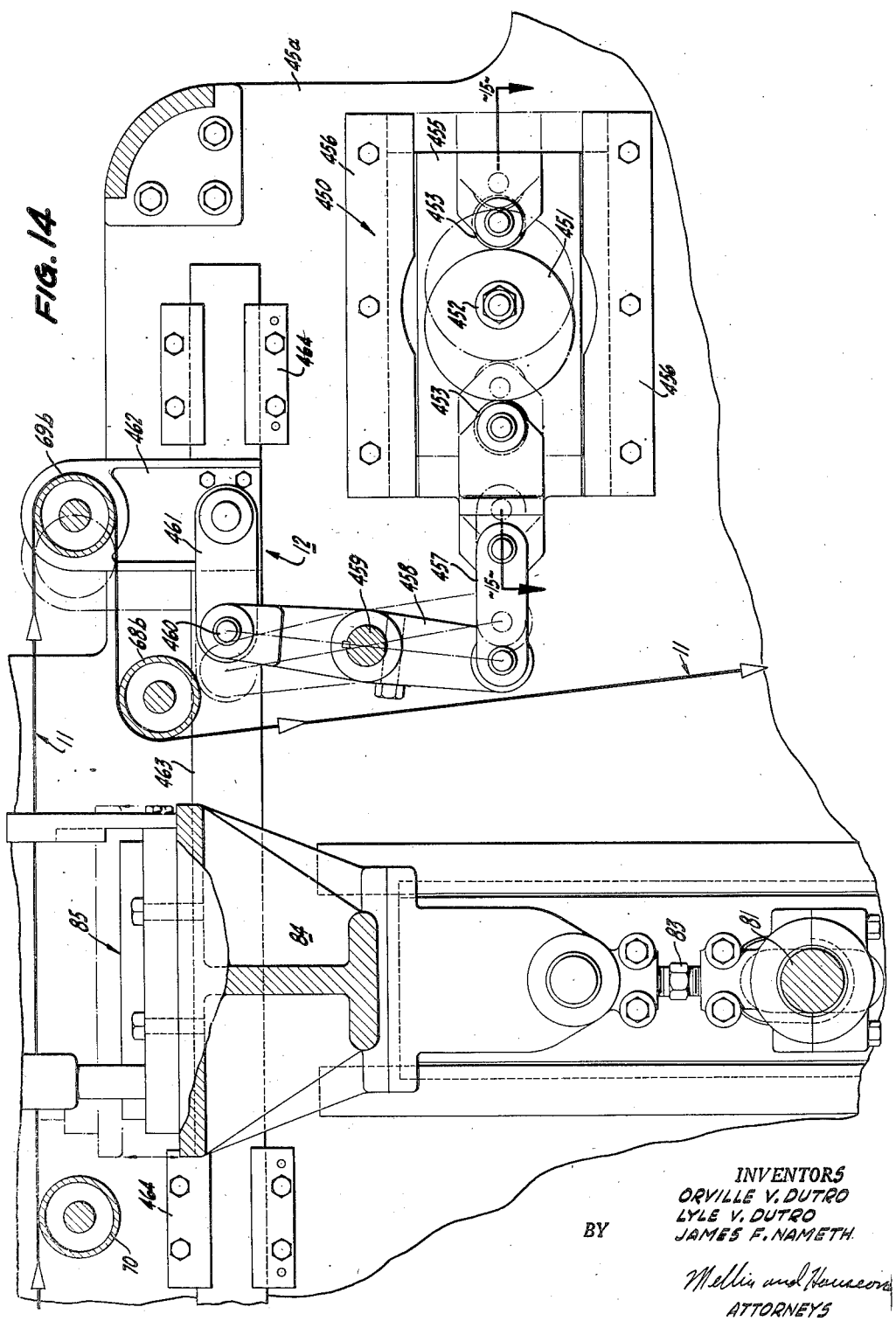

Figure 14 is a partial view, on a larger scale, of the shuttle device employed to maintain the web stationary at the piercing and notching stations while perforations and notches are being punched in the web.

Figures 15, 16:
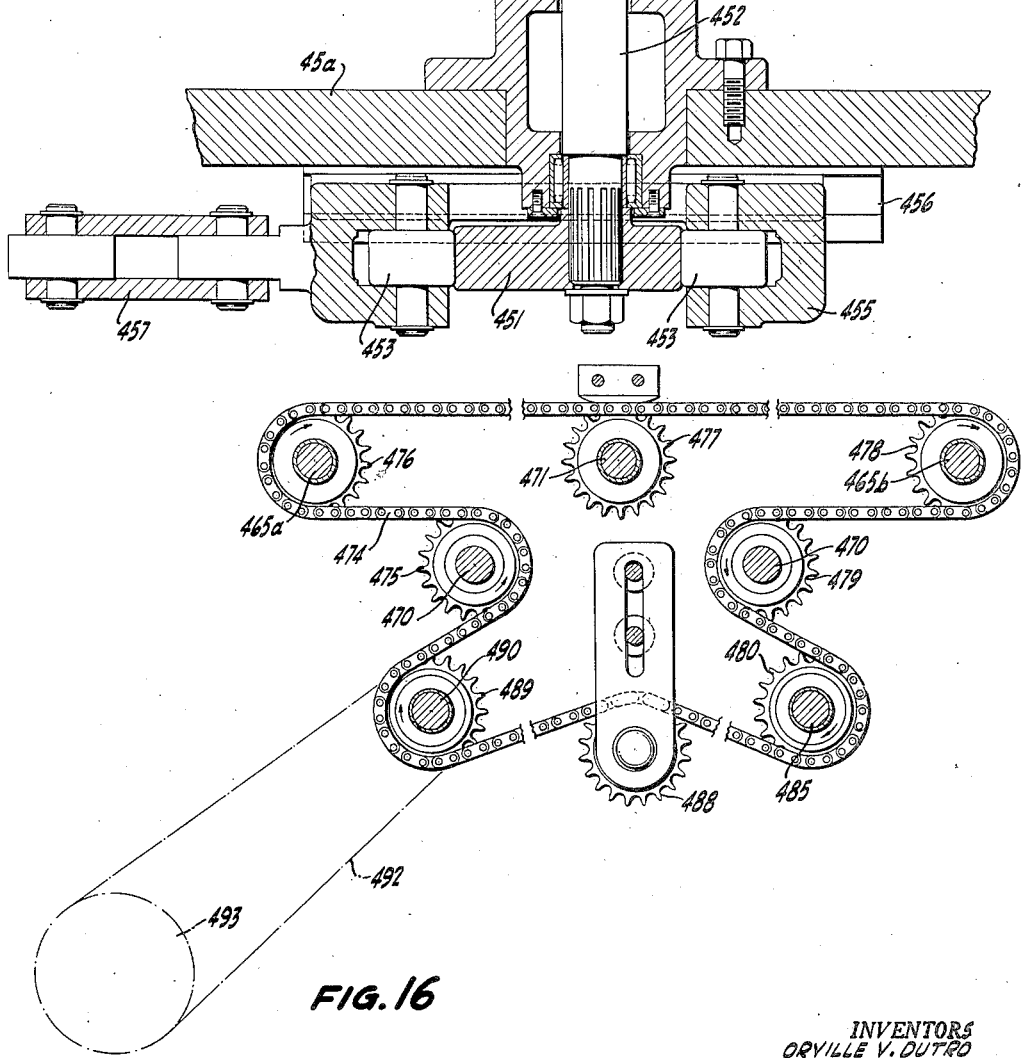

Figure 15 is a section taken along the line 15—15 of Figure 14.

Figure 16 is a view of the shuttle chain drive as would be seen looking out from the side plate on the gear side of the machine; that is to say, on the right-hand side of the machine as viewed in Figure 3.

Figures 17, 18 and 19 are views taken along the lines 17—17, 18—18 and 19—19, respectively, of Figure 1 showing certain details of the shuttle mechanism.

Figure 20 is a partial view in end elevation of the notching assembly showing several notching punches in operative position.

Figure 21 is a top plan view, partly broken away, of the notching assembly, the view being taken transversely to the longitudinal center line of the machine.

Figure 22 is a section taken along the line 22—22 of Figure 21.

Figure 23 is a fragmentary view taken along the line 23—23 of Figure 22, being a top plan view of the stripper plate.

Figure 24 is a section taken along the line 24—24 of Figure 21, showing a single row of notching punches.

Figure 25 is a section taken along the line 25—25 of Figure 21, showing several of the manually operated notching punches and the hand set means employed to operate them.

Figure 26 is a fragmentary view similar to that of Figure 25 but on a larger scale, showing certain details of the hand set means.

Figure 27 is a section taken along the line 27—27 of Figure 26, showing a row of hand set levers in end elevation.

Figure 28 is a section taken along the line 28—28 of Figure 26.

Figure 29 is an end view of the automatic slide positioning mechanism employed to operate the automatic notching punches.

Figure 30 is a view similar to that of Figure 29 but taken from the opposite end of the slide positioning mechanism.

Figure 31 is a section taken along the line 31—31 of Figure 29.

Figure 32 is an exploded view of the cams and ratchets of the automatic slide positioning mechanism.

Figure 33 is a fragmentary view of a card notched by means of the notching assembly.

Figure 34 is a section taken along the line 34—34 of Fig. 1, showing the shear assembly in end elevation.

Figure 35:
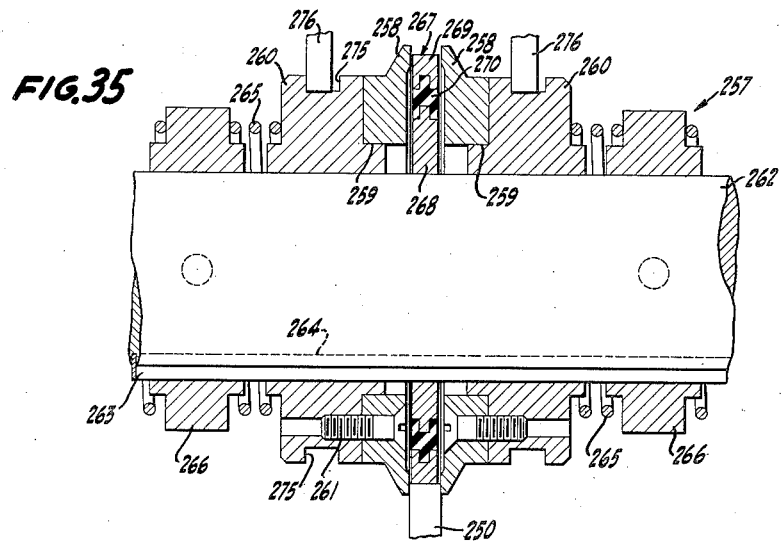

Figure 35 is a fragmentary longitudinal section, on a larger scale, taken through one of the shears of Figure 34.

Figure 36:
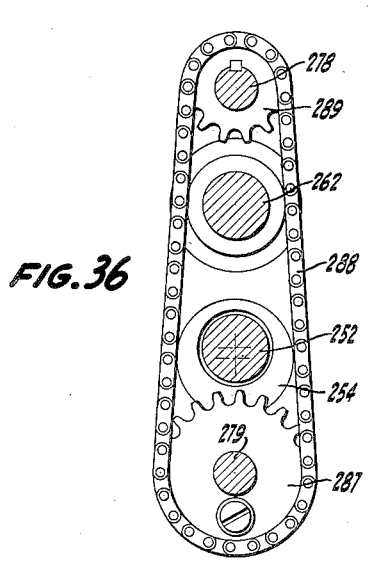
Figure 37:
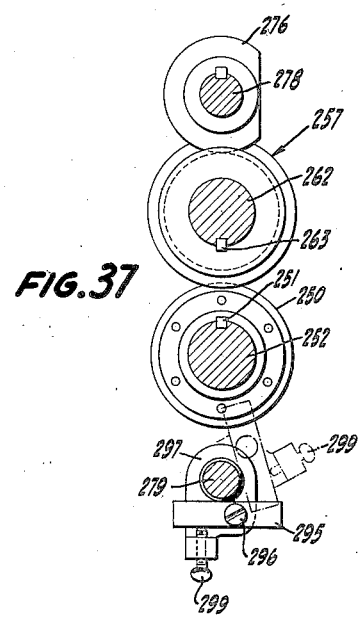

Figures 36 and 37 are sections taken along the lines 36—36 and 37—37 respectively of Figure 34.

Figure 38:
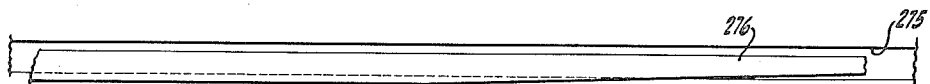

Figure 38 is a development of one of the cams employed for retracting the shears of Figure 34.

Figure 39 is a diagrammatic view of part of the gear and chain-and-sprocket trains employed to drive and time the various elements of the machine, the view being taken on the gear side of the machine looking out from the side plate.

Figure 40 is a view similar to that of Figure 39 and is a continuation thereof, showing the remaining portion of the driving and timing mechanism.

*General organization*

Referring now to the drawings, and more particularly to Figures 1 and 2A to 2C, the machine is generally designated as 10, and it is continuously fed with a web 11 which is shown entering the machine at the left in Figure 1. The machine embodies a numbering station A, a piercing station B, a notching station C, and a shearing station D, the general functions of which will be explained briefly hereinafter with reference to Figure 2. For the purpose of maintaining the web stationary at the piercing and notching stations during the punching operations, a shuttle mechanism generally designated as 12, is provided.

Referring now to Figures 2A, 2B and 2C, the web 11 is there shown as it proceeds through the machine. The web may be supplied by a suitable printing press (not shown) which prints individual cards 13 thereon, and it is of sufficient width to provide several rows, e. g. five rows, of cards 13. Each card 13 is printed with longitudinal and transverse lines 14 defining fields 15 and in each field 15 the digits 1, 2, 4 and 7 are printed in the manner illustrated in Fig. 33 or Fig. 2A. As is well known in the art, the extreme right-hand field corresponds to units and, proceeding to the left, the next field corresponds to tens, the next to hundreds, etc. As is also well known in the art, by appropriately notching a field any one of the digits from 0 to 9 inclusive can be coded therein. Thus, if it is desired to code the number 1, 2, 4 or 7 in the extreme right-hand or units field 15, the field is notched at that number. The cipher is indicated by the absence of any notch, and the digits 3, 5, 6, 8 and 9 are formed by appropriate combinations of the digits 1, 2, 4 and 7. Thus, to code the units field to correspond to the number 5, that field is notched at both 4 and 1.

It will be apparent, of course, that other information may be printed on the cards 13, and that the fields 15 may be of a different character; e. g., they may be arranged in an inner row and an outer row.

At the numbering station A each card 13 is printed transversely with a serial number at 17 and also longitudinally with the same serial number at 18. At the piercing station B the several fields 15 are punched to form the marginal perforations 19. At the same time, a triangular opening is punched out to provide a beveled corner 20. At the notching station C the cards are notched to correspond to or code the serial numbers printed thereon at station A. Thus, it will be seen from an inspection of the extreme right-hand card in Figure 2B that the Serial Number 9987 is printed on the card at 17 and 18 and the same number is also notched into the card by means of the notches 25.

The web then proceeds to the shearing station D where each card is perforated along longitudinal lines 26 and transverse lines 27 to provide detachable stubs. As explained hereinafter, either or both of the perforating operations may be eliminated if so desired. The web is also sheared at station D along longitudinal lines 28 and transverse lines 29 to cut out and trim the individual cards from the web, each of which is of precise dimensions. The end product is shown in Fig. 2C as having a body portion 31 which may have any suitable indicia and information printed thereon, longitudinal and transverse detachable portions 32 and 33 and, of course, printed serial numbers at 17 and 18, fields 15, perforations 19 and the notches 25 corresponding to the printed serial numbers.

*The numbering assembly*

As stated, the web 11 enters at the left-hand end of the machine, as viewed in Fig. 1, and it is first run through the numbering station A to have serial numbers printed thereon. This is accomplished by means of a numbering assembly which is generally designated as 40. The web is fed to the numbering assembly 40 by means of a driven conveyor roller 41 and a friction roller 42 supported at one end of an arm 43, the other end of which is pivotally supported at 44 upon a side plate 45a of the machine. The web is fed by means of these rollers to an impression cylinder 46 (see Figs. 3 and 4), which is journaled in the side plates 45a and 45b of the machine. The impression cylinder is provided with a hard rubber surface 47. Numbering is accomplished by means of a first numbering reel 39a and a second numbering reel 39b. Each reel comprises a pair of substantially identical numbering machines 48a or 48b mounted on numbering shafts 49a and 49b respectively. As will be seen, two numbering machines 48a are mounted on the shaft 49a 180° apart and two numbering machines 48b are mounted on the shaft 49b 180° apart. These numbering machines are of conventional construction and require no detailed description herein. Briefly, each comprises the usual tumblers 50 which are actuated by means of a lever 51 having a follower 52, and a cam 53a or 53b. These cams 53a and 53b are keyed to cam shafts 54a and 54b, respectively, which are journaled in the side plates of the machine. The tumblers 50 are actuated by the cams 53a and 53b in a manner which is well known in the art, so as to subtract one number each half revolution of the numbering shafts 49a and 49b. As illustrated, the numbering machines 48b are of the barrel type; that is, their tumblers 50 are disposed along an arc of the same radius as and tangent to the web as it passes over the impression cylinder 46, whereas the numbering machines 48a are of cylindrical shape. The spacing between the numbering shafts 49a and 49b is such that transverse numbers are printed on two successive cards at 17 by the numbering machines 48a and then a longitudinal number is printed on the first of these cards at 18 by one of the numbering machines 48b. It will be understood, of course, that as many pairs of numbering machines 48a and 48b are mounted on each numbering shaft 49a and 49b, as there are rows of cards 13 on the web. The numbering machines 48a and 48b are adjustable on their shafts to locate the serial numbers on the cards as desired.

For the purpose of inking the numbering machines 48a and 48b, a more or less conventional inking assembly 57 is provided. This assembly comprises an ink fountain 58 (see Fig. 1), a fountain roller 59, a ductor roller 60 mounted on an arm 66 which is pivotally mounted by a shaft 62 journaled in the side plates of the machine. The shaft 62 is oscillated by any suitable means (not shown) to transfer ink from the fountain roller 59 to a vibrator roller 63 which oscillates axially and also rotates continuously to transfer ink to form rollers 64 which make contact with and ink the numbering machines 48a and 48b.

After passing through the numbering assembly 40, the web is led under guide rollers 66 and 67 which are journaled in the side plates of the machine, thence over a stationary shuttle guide roller 68a and over a movable shuttle roller 69a, both of which form a part of the shuttle mechanism 12. Thence the web travels through the piercing station B and the notching station C, then over a movable shuttle roller 69b and a stationary shuttle roller 68b.

As shown in Figure 1 the piercing assembly, which is generally designated as 73, comprises a crank shaft 74 to which is fixed a counter weight 75 and an adjustable connecting rod 76. To the upper end of the rod 76 is connected a ram 77 and a female die 78 which is reciprocated by the crank shaft 74. A stationary male die 79 is provided for cooperation with the female die 78. The piercing assembly 73 is of conventional design and requires no further description herein.

*The notching assembly*

The notching assembly is disclosed and claimed in the copending application of Orville V. Dutro and James F. Nameth, Serial No. 180,833, filed August 22, 1950, and entitled Punch Press for Notching. As is also shown in Figure 1 the notching assembly, which is generally designated at 80, comprises a crank shaft 81, a counterweight 82, and an adjustable connecting rod 83 connected at its upper end to a ram 84 which supports a reciprocable female die assembly 85 which cooperates with a stationary male die assembly 86.

The female die assembly 85 and the male die assembly 86 are shown in cross section and transversely to the longitudinal center line of the machine in Figure 22 and the male die assembly is shown in top plan view 21. Referring now to these figures, the female die assembly 85 comprises a die block or base 90 formed with a plurality of recesses 91 within which die inserts 92 are disposed. Each die insert 92 is formed with an accurately machined die opening 93 which widens out at its lower end, as illustrated, and opens into a stepped, progressively widening opening 94 formed in the die block 90, for the purpose of allowing cuttings punched from the web to drop freely from the die assembly. Each die opening 93 is precisely and accurately registered with a punch 95 by means of a packing 96a. As illustrated in Figure 22 there are five rows of die openings 93 and a corresponding number of rows of punches 95 arranged transversely of the machine, thus providing means for notching a web having five rows of cards. Also, there are as many die openings 93 and punches 95 in each row, as there are perforations 19 in a card 13; i. e., there are a punch and die opening for each perforation. Obviously, of course, the number of die openings 93 and punches 95 may be greater or less according to the nature of the web and of the cards printed thereon.

The male die assembly 86 comprises a male die block or punch carrier 96 which is spaced a slight distance above the female die block 90 when the latter is in its up or closed position, by means of spacers 97 fixed to the female die block 85. Also the male die block 96 is formed with recesses 98 corresponding in number and position to the recesses 91 in the female die block, and in each of the recesses 98 there is seated an insert 99 which is accurately positioned by means of a packing 100. Each insert 99 is formed with a passage 103 to slidably receive a punch 95.

Referring now more particularly to Figure 24, the male die block or punch carrier 96 is formed with shoulders 106 which are received within a recess 107 formed in a guide block 108 which is fixed to a top plate 109 by means of screws 110 and is accurately located by means of dowel pins 111. The top plate 109 is fixed to the frame of the machine. The recess 107 provides shoulders 112 and 113 which serve to limit travel of the punch carrier 96, and the latter is urged downwardly by means of expansion springs 114 which are seated in recesses 115 formed in the guide block 108 and which bear at their lower ends against the punch carrier 96. Disposed above the punch carrier 96 is a stripper plate 125 which is notched at its edges at 126 to receive guide members 127 which are fixed to the punch carrier 96 and are provided at their upper ends with inwardly extending portions 128 to limit upward movement of the stripper plate. The stripper plate 125 is formed with a plurality of passages 130, one for each of the punches 95, and, as is shown in Figure 22, each of the punches is formed with shoulders 131 and 132. A leaf spring 133 (see also Fig. 23) is fixed to the stripper plate by means of screws 134 and it is slotted to provide an individual finger or spring member 135 for each of the punches 95, each such finger bearing against the shoulder 131 of its punch and urging it upwardly. Upward movement of the punch is limited, however, by abutment of the other shoulder 132 with a stop plate 136 fixed to the stripper plate by means of screws 137.

As also shown in Fig. 22, the stripper plate 125 is seated on expansion springs 138 which are seated in recesses 139 and 140 formed in the stripper plate 125 and in the punch carrier 96, respectively.

For the purpose of actuating the punches 95, a plurality of slide bars 145 are provided. As shown in Figure 21, there are sixteen slide bars bracketed and indicated as a, and eight slide bars bracketed and indicated as m. The slide bars 145a are automatically operated and the slide bars 145m are manually operated, in the manner and for the purpose explained hereinafter.

The slide bars 145a are slidably supported for axial movement transversely of the machine by means of a slide support block 146 and slide support bars or straps 147 which are fixed at their ends to the slide support block. The bars 147 extend underneath and are received in notches 148 formed in the slide bars 145a. At its left-hand end, as viewed in Figure 22, each slide bar 145a is slidably received within a passage 149 formed in an end guide block 150 and at its extreme left-hand end it is rounded as indicated at 151. At its opposite or right-hand end, there is provided a torsion spring 152, one end of which is fixed to a rotatable shaft 153 while the other end bears against the adjacent end of the slide bar. As shown in Figure 21, one end of the shaft 153 is squared at 154 to receive a wrench for the purpose of rotating the shaft and adjusting the tension of the springs 152. When suitable adjustment has been made, the shaft 153 is clamped in adjusted position by means of a set screw 155.

It will be apparent that, if a given slide bar 145a is in its extreme right-hand position as shown in Fig. 22, the bottom edge of the bar will abut the punches 95 and will force them downwardly into the die openings 93. However, if a slide bar is in its extreme left-hand position so that the upper end of its punches are received within the recesses 148 the spring members 135 acting on the shoulders 131 will urge the punches upwardly so as to clear the lower end of the passages 105 formed in the male die inserts 99.

As stated, the sixteen slide bars designated in Fig. 21 as 145a are automatically operable, while those designated as 145m are manually operable. For the purpose of automatically operating the automatic slide bars 145a there is provided a cam assembly 159. This assembly is shown in top plan view in Fig. 21 and in end view in Fig. 22, and it is shown in detail and on a larger scale in Figs. 29 to 32 inclusive. Referring more particularly to Figs. 31 and 32, four cam-and-ratchet sets 160 are provided for operating the automatically shiftable slide bars 145a. One cam-and-ratchet set is illustrated in exploded view in Fig. 32. As there shown, a ratchet 161 and cams 162a, 162b, 162c and 162d are provided. The cams are formed with lobes 163 and the ratchet with teeth 164 and with a U-shaped recess 165. The ratchet and the cams are formed with axial holes 166 and with smaller holes 167 on opposite sides of the axial holes, the holes 167 being in alignment with one another. All of the ratchets 161 and cams 162a, 162b, 162c and 162d are mounted on a bushing 168 which is rotatable on a shaft 169 and the four cams and the ratchet of each set are fixed together so as to be relatively non-rotatable and so that the lobes 163 of the different cams are in predetermined angular positions relatively to one another. This is achieved by means of pins 169a passing through the holes 167. The heads of these pins are machined so that adjacent cam-and-ratchet sets are free to rotate relatively to one another.

The shaft 169 is carried by a U-shaped bracket 170 which is fixed to the frame of the machine. A pawl carrier 171 of generally U-shaped configuration is pinned at 172 to the shaft 169 and it carries a plurality of pawls 172a, 172b, 172c and 172d corresponding to and in registry with the ratchets 161, there being one pawl for each ratchet. The pawls 172a, etc., are fixed at their upper ends to one end of an arm 173, the other end of which is fixed to a shaft 174 which is rotatably mounted on the pawl carrier 171 and is urged in a clockwise direction as viewed in Fig. 30, or toward the cams 162a etc. by means of a torsion spring 175. The pawl carrier 171 is urged in a counter-clockwise direction as viewed in Fig. 30, by means of a tension spring 180 pinned at 181 to the pawl carrier and at 182 to the cam assembly support bracket 170. A latching pawl 183 is provided for each ratchet 161 and it is pivotally supported at 184 on the pawl assembly support bracket 170. Each latching pawl has a nose 185 engageable with the teeth of its ratchet 161, and at the upper end of each pawl 185 an expansion spring 186 is provided to urge the pawl in a clockwise direction as viewed in Fig. 29, each spring 186 bearing at one end against the upper end of its latch pawl 183 and being seated at its other end in a recess 187 formed in a bar 188 fixed to the cam assembly support bracket 170.

There is also provided an actuator lever 189 which is pinned at 190 to one end of the shaft 169. At its lower end the lever 189 carries a cam follower 191. To operate the actuator lever 189 and hence the cam assembly, there is provided an upright post 192 which is fixed to the female die assembly and has formed thereon a cam surface 193 engageable with the cam follower 191. (See Figs. 20 and 22.) As is also shown in Fig. 20, there is provided a kick-out lever 194 fulcrumed at its upper end on a shaft 196 to the other end of which is fixed a lever or pawl 197 engageable with a notch 198 formed in the actuator lever 189. The kick-out lever 194 is operated by means of reciprocable shaft 200 pivotally connected thereto at 201 and it is urged in a counterclockwise direction as viewed in Fig. 20 by a spring 202. The shaft 200 is operated in a manner and for a purpose explained hereinafter.

The automatic portion of the notching assembly thus described operates as follows:

As explained above, the crankshaft 81 causes reciprocation of the female die assembly 85. The male die assembly 86, as a whole, remains stationary. The position of each of the automatic punches 95 is determined by the position of its slide bar 145a. Thus, referring to Fig. 22, if the slide bar 145a for a given row of punches 95 is located so that its recesses 148 lie above the punches, the spring members 135 will urge those punches upwardly to seat their top portions in the recesses 148. It will be apparent that the lower ends of these actuated punches will then lie wholly within the guide blocks 99 and will be inactive. On the other hand if, as shown in Fig. 22, a given slide bar 145a is located so that its lowermost edge overlies the punches, then these punches will of necessity be urged downwardly against the force of the spring members 135 and their lower ends will protrude through the lower ends of the passages 105. These punches will, therefore, be in active position for cooperation with the female die 85. As the latter ascends, a notch will be punched in the web corresponding to each of the punches 95 which is held in active position by a slide bar 145a. It will also be apparent that when the female die block 90 ascends it will compress both sets of expansion springs 114 (see Fig. 24) and 138 (see Fig. 22). As the die block 90 descends, thus releasing pressure on these springs, they will, of course, expand. The punch carrier 96 will, therefore, travel downwardly until its shoulder 106 limits on the shoulder 112 of guide block 108 and will carry the web with it. The springs 138 will spread the stripper plate 125 and the punch carrier 96 apart, thus effectively stripping the punches 95 from the web so that it is instantly free to travel forwardly.

The automatic slide bars 145a are operated by the cam assembly 159 which in turn is operated by reciprocation of the female die assembly 85. When the female die assembly 85 is in the down position, as shown in Fig. 20, the upper, vertical portion of cam surface 193 on post 192 is in contact with the cam follower 191 thus holding the actuator pawl 189 in the position shown against the tension of spring 180 (see Fig. 30). When the female die assembly ascends, the cam surface 193 rides up the follower 191, thus allowing the actuator pawl 189 to rock clockwise under the urging of spring 180. One of the pawls 172a, 172b, etc. is in engagement with a tooth of its ratchet 161 and therefore imparts an increment of movement to that ratchet. The cam assembly is, of course, recocked when the female die assembly descends again.

It will be seen that the pawls 172a, 172b, etc. are of different lengths. The longest pawl 172a actuates that ratchet 161 and set of cams 162a, 162b, etc., which is designated as units in Fig. 31. As long as this pawl remains in engagement with a tooth 164 of its ratchet 161, the remaining pawls 172b, 172c, etc. will be held out of engagement with their ratchets. When, however, the pawl 172a has completed a full cycle and has dropped into the U-shaped recess 165 of its ratchet, the next longest or tens pawl 172b will engage its ratchet 161. A whole cycle for the cam assembly 159 as a whole is completed when each of the pawls 172a, 172b, etc. has in its turn completed its own cycle.

The lobes 163 on each set of cams 161 are so spaced as to actuate their slide bars 145a in the proper combinations and sequences, to punch out notches corresponding to 9, 8, 7, 6, 5, 4, 3, 2 and 1 and to leave one card unnotched to denote 0. It will, therefore, be apparent that as the web 11 proceeds through the notching station C, it will be notched to number the cards from 9999 to 0000. Since there are five rows of cards and since each row is similarly notched, a complete cycle or run of the notching assembly will punch fifty thousand cards numbering them in sets of 9999 to 0000.

To achieve consecutive numbering of all fifty thousand cards produced in a run, the manually operable slide bars 145m are employed. The construction and operation of these bars will now be described.

Referring now to Figs. 24 to 28, it will be seen that the manual slide bars 145m are sectional in construction, the several sections being indicated as 209 and they are slidably connected by overlapping tongues 210. Each of the sections 209 is formed with a notch 211 to receive the end of a lever 212, there being five sets of levers for the five rows of cards across the web (see Fig. 21) and eight levers in each set which are arranged in side-by-side relationship as is best shown in Fig. 27. Each set of levers 212 is encompassed by a frame 213 and the levers are mounted on a shaft 214 which is rotatable in the ends of the frame 213. The sections 209 are shifted by the operation of the levers 212 and each lever, after having been adjusted to the desired position, i. e., to the right or left, is clamped in the selected position by means of one of a pair of wedges 215 which are disposed on opposite sides of the lever. A slidable connection is provided between the wedges 215 and levers 212 by means of a dovetailed joint 216 (see Fig. 28) and each of the wedges 215 is formed with a hole 218 for engaging a tool which is employed for the purpose of manipulating the wedges.

It will be seen that each of the slide bar sections 209 is formed along its under surface with a recess 148a similar to the recesses 148 of the automatic slide bars 145a, and that by shifting a lever 212 to the left as viewed in Fig. 26, the recess 148a of the corresponding section 209 will receive the corresponding punch 95 and will thereby inactivate that punch. By shifting the lever 212 to the right, the punch 95 is depressed and thereby activated.

In operation and assuming that it is desired to consecutively notch a run of fifty thousand cards, one of the sets of levers 212 will be manipulated to activate the 4 punch, thereby punching out notches in one row of cards corresponding to the number 4; the next set of levers will be manipulated to activate the 2 and 1 punches, thereby punching out notches in the adjoining row of cards corresponding to the number 3. Similarly, the two adjoining sets of levers 212 will be adjusted to punch out notches in the corresponding rows of cards corresponding to 2 and 1. The last set of levers 212 will be adjusted to inactivate all the punches, thereby indicating 0 on the last row of cards.

It will thus be apparent that a full cycle of the cam assembly 159 and their slide bars 145a and punches 95 will produce fifty thousand cards which will be notched to number them consecutively from 49999 to 00000.

*The perforating and the cutting and trimming assemblies*

After the web leaves the notching assembly it travels over the movable shuttle roller 69b and the stationary shuttle roller 68b, thence over guide rollers 225 and 226 (see Figure 1) to the cutting and trimming assembly. Still referring to Figure 1 it will be seen that the web passes between a driven conveyor roller 227 and a pressure roller 228 mounted at one end of an arm 229 which is mounted on a shaft 230 which is rotatable in the side plates of the machine. Thence the web passes between a longitudinal anvil roller 231 and a perforating roller 232, mounted on an arm 233 which is mounted on a shaft 234. The perforating roller 232 is provided with means (not shown) well known in the art for perforating the card longitudinally to provide the longitudinal perforations 26 as shown in Figure 2C. Thereafter the web passes between a cross perforating roller 235 and an anvil roller 236 to form the cross perforations 27. Then the web passes through a longitudinal slitting assembly generally designated as 237 and which is described in detail hereinafter and then through a cross cutter 238 of conventional construction. The longitudinal slitting assembly is disclosed and claimed in the copending application of Lyle V. Dutro and James F. Nameth, Serial No. 180,834, filed August 22, 1950, and entitled Shear Assembly. Individual cards are fed to the right as indicated by the arrows in Figure 1 and waste strip material 245 severed from the web by the longitudinal slitting assembly passes downwardly between a driven conveyor roller 246 and a friction roller 247 into a waste receptacle 248.

Referring now to Figures 34 to 38, the longitudinal slitting assembly comprises a plurality of rotatable dies or gauging members 250 which are keyed at 251 to a shaft 252 which is journaled at its ends in eccentric bushings 253 and 254. The bushings 253 and 254 are clamped in adjusted position by means of set screws 255. The dies 250 are clamped in adjusted position by means of set screws 256 and there will, of course, be as many of the dies 250 as there are waste strips 245 to be cut from the web. The upper shear assembly 257, as is best shown in Figure 35, comprises a pair of annular blades 258 for each of the dies 250, and each of the blades 258 is seated in an annular recess 259 formed in a collar 260 and is clamped to its collar by means of screws 261. The collars 260 are slidably but non-rotatably mounted on a shaft 262 by means of a key 263 and keyway 264. The shaft 262 is journaled in bushings 264a and 264b (see Fig. 34) and is clamped in position by means of a collar 264c. Each pair of collars 260 and blades 258 are urged inwardly toward one another by means of expansion springs 265 each of which is compressed between a collar 260 and another collar 266 clamped to the shaft 262. Between each pair of blades 258 is disposed a disc 267 comprising a central portion 268, an outer annular portion 269 and an annular rubber cushion 270 disposed between the inner and outer portions. The collars 260 are formed with annular grooves 275 to receive cams 276 each of which has a cam surface 277 as illustrated in Figure 38. The cams 276 are mounted on a splined shaft 278 which is journaled in the side plates of the machine. The function and purpose of the cams 276 will be explained hereinafter.

Means are provided for separating the dies 250 from the blades 258 and for spreading the blades apart to permit access to the blades for purposes of inspection, repair and replacement, and means are also provided for accurate alignment of the blades. Such means will now be described.

Referring to Figure 34, a shaft 279 is provided which is journaled in the side plates of the machine and is provided at one end with a crank 280. A retractable pin 281 is provided which is urged inwardly by means of a spring 282 so as to seat its inner end in a socket 283 formed in the outer end of a bracket 284. The pin 281 serves the purpose of locking the crank 280 in the up position as shown. Gears 285 are fixed to the shaft 279 and mesh with gears 286 fixed to the eccentric bushings 253 and 254. It will therefore be apparent that, when the crank 280 is turned from the up position, the eccentric bushings 253 and 254 will be rotated and the shaft 252 will be lowered from its up position as shown in Figure 34 in which the dies 250 are in operative engagement with the blades 258. By this means a separation of the blades 258 and the dies 250 is achieved for the purpose indicated above.

As is also shown a sprocket 287 is clamped to the shaft 279 and is connected through the medium of a chain 288 to a sprocket 289 which is clamped to the shaft 278. It will therefore be apparent that rotation of the crank 280 will also rotate the shaft 278 and with it the cams 276. The profile of the cams 276 is such that when the crank 280 is rotated to separate the dies 250 from the blades 258, the cams 276 will spread the blades 258 apart against the force of expansion springs 265. The locking pin 281 will then be seated in an appropriate recess (not shown) similar to the recess 283, to lock the shaft 279 and the various parts actuated thereby in their appropriate positions during such time that is desired to inspect and repair the shear assembly.

Proper alignment of the dies 250 and blades 258 is accomplished by means of alignment blocks 295 which are fixed at 296 to collars 297. Each collar 297 is rotatable on the shaft 279, and each block 295 rides in and is guided by an annular groove 298 formed in the shaft 279. When it is desired to align the dies 250, the collars 297 are rotated in counter-clockwise direction as viewed in Fig. 37 until the blocks 295 are in the up position, and they are clamped in that position by means of set screws 299. The dies 250 are then adjusted to bring them flush against the blocks 295 and are clamped in adjusted position. Thereafter, the set screws 299 are released to allow the blocks 295 to drop clear of the dies 250.

It will be apparent that the shear assembly 257 is provided with means for rapid adjustment to separate the engaging parts for inspection and repair; that means are provided for rapid readjustment to operative relationship of the parts; and that alignment means are provided for accurately registering the several operating parts to ensure precise and accurate shearing of the web. It will also be apparent that the shafts 252 and 262, which carry the working parts subject to wear, can be easily removed from their bushings to allow removal of the blades and dies to a repair shop.

*The kick-out mechanism*

It will be apparent that a lag exists between numbering the cards at the numbering station A and notching the cards at the notching station C. Therefore, unless a time delay is provided, when the machine is stopped or when for any reason the numbering assembly is stopped, the notching assembly will become out of phase with the numbering assembly. To avoid this possibility a kick-out or time delay mechanism is provided, which will now be described.

Referring to Figure 4, a solenoid 310 is provided for the purpose of operating the time delay or kick-out mechanism. This solenoid may be actuated by a manual switch (not shown) or it may be actuated automatically so as to operate the kick-out mechanism in response to operation of a printing press (not shown) which prints the web, or it may be actuated automatically in response to the condition of the web; e. g., to operate the kick-out mechanism when the web is broken. Such actuating means are well known in the art and require no description here.

The solenoid 310 has a plunger 311 which is connected by a link 312 to a lever 313 which is normally held in the down position shown in Figure 4, by a tension spring 314 which is pinned at 315 to the frame of the machine and at 316 to one end of the lever 313. The other end of the lever 313 is fulcrummed on a stud 317 fixed to the frame of the machine and the lever 313 is formed with a detent 318 engageable with a notch 319 formed in a sector 320. A bell crank lever 321 is also fulcrummed on the stud 317 and it has a nose 322 which is also engageable with the notch 319. The sector 320 is fixed to a shaft 323 journaled in the frame of the machine, and to the shaft 323 is fixed a gear 324 which meshes with a sector gear 325 rotatable on a shaft 326 and formed with a lever or arm 327. A link 328 is pivotally connected at 329 to the sector 320 and it is slotted at its lower end at 335 to slidably receive a pin 336 fixed to one end of a lever 337 which is fixed to a stud 338 rotatably mounted in a bracket 339 fixed to the frame of the machine. A spring 340 is pinned at one end at 341 to the frame of the machine and at its other end to a pin 342 fixed to the shaft 323. The spring 340 opposes a weaker spring 343 which is pinned at one end at 344 to the frame of the machine and at its other end to the pin 336 on lever 337.

A clutch disengaging post 345 is also fixed to the stub shaft 338 to operate a clutch 346 of conventional construction which provides a driving connection between a large gear 347 fixed to a shaft 348 and a small gear 349 rotatable on the shaft 348, which is journaled in the frame of the machine. The clutch 346 is disengaged whenever the stop member 345 is in the upright position and in engagement with notch 346a formed in the clutch. When, however, the stop member 345 is pivoted clockwise so as to disengage the notch 346a, the clutch 346 automatically engages, thus providing a driving connection between the gears 347 and 349. Cushion means is provided in the form of a yieldably supported pin 345a, as illustrated.

The driving gear 347 is driven by a pinion 350 fixed to a shaft 351 (see Fig. 39) which in turn is driven in the manner hereinafter described at press speed; for example, at 60 R. P. M. The driven gear 349 is in mesh with a larger gear 355 which is fixed to a cam shaft 356 journaled in the frame of the machine. The ratio between the gears 347 and 355 is ten to one so that if the speed of the machine is 60 R. P. M., the speed of the gear 355 and cam shaft 356 will be 6 R. P. M. assuming, of course, that the clutch 346 is engaged. The cam shaft 356 operates a kick-out cam assembly 357 (see Figure 10) for the purpose and in the manner described hereinafter.

It will be apparent that the driven gear 349, hence the cam shaft 356 and cam assembly 357, will remain motionless as long the sector 320 remains in the position shown in Figure 4; that is, with its notch 319 in engagement with either or both of the levers 313 and 321 and with the pin 336 on lever 337 intermediate the ends of the slot 335 such that the spring 343 is free to urge the post 345 in a counter-clockwise direction to engage the notch 346a and thereby disengage the clutch 346. As shown, a bell crank lever 365 is rotatable on the shaft 351 and one arm of this lever lies in the path of a pin 366 fixed to and projecting from one face of the driving gear 347. The other arm of the lever 365 is connected by a link 367 to the bell crank lever 321. It will thus be apparent that during each revolution of the driving gear 347 the lever 365 will be rocked in a counterclockwise direction as viewed in Figure 4 and, accordingly, that the nose 322 of the lever 321 will be disengaged from the notch 319 in sector 320 during each revolution of the driving gear 357. After the pin 366 passes the lever 365 a tension spring 368 will operate to rock the bell crank lever 321 back into position for engaging the notch 319 in sector 320. As shown, the tension spring 368 is pinned at 369 to the lever 365 and at 370 to the frame of the machine.

It will also be apparent that, notwithstanding the periodic disengagement of the lever 321 from sector 320, the latter will be held stationary by the lever 313 and its detent 318 as long as the solenoid plunger 311 remains in the down position shown in Fig. 4. When, however, the solenoid 310 is actuated to lift its plunger and the lever 313, the detent 318 will disengage the notch 319. When this occurs, the sector 320 will be held stationary by the lever 321 until a predetermined point in the cycle of the impression roller 46 has been reached. At this instant the bell crank lever 365 will be struck by the pin 366 and the lever 321 will disengage the notch 319.

Figure 5:
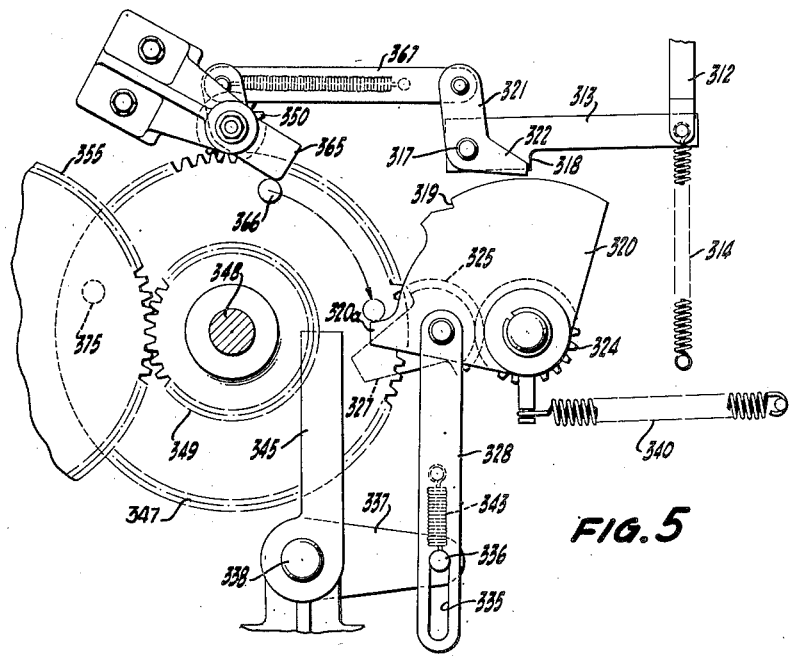
Figures 5 and 6 are detailed views of the kickout mechanism as they appear in Figure 4, but in different operative positions.
Figure 6:
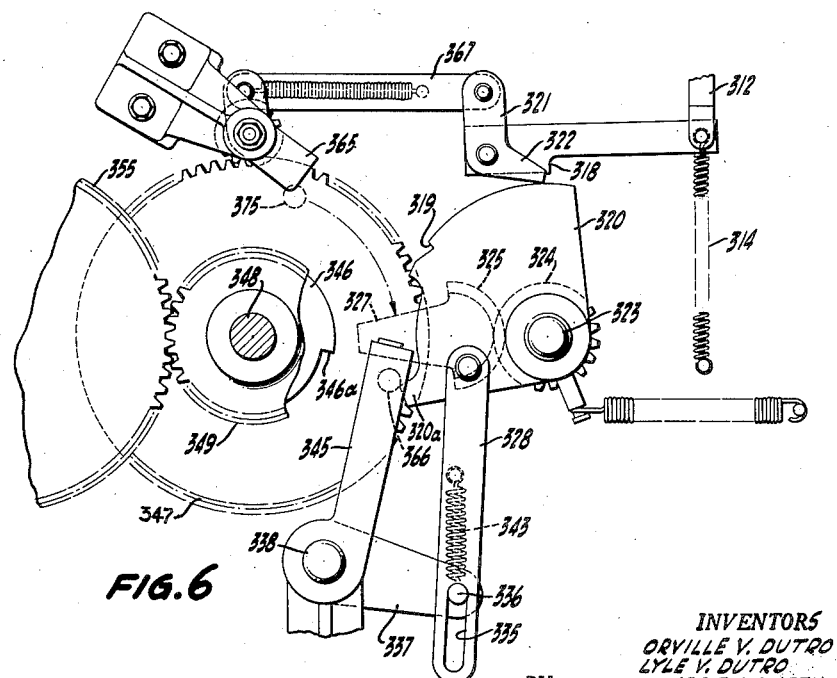

When disengagement of both levers 313 and 321 from the sector 320 has been effected the stronger tension spring 340 will, of course, operate to rock the sector 320 in a counterclockwise direction, thus bringing the upper end of the slot 335 in link 328 to bear upon the pin 336, as shown in Fig. 5. At a predetermined point in the cycle of the gear 347, the pin 366 will also strike a lug 320a formed on the sector 320, since the lug now lies in the path of the pin 366. This will operate to rock the lever 337, shaft 338 and post 345 in a clockwise direction. The clutch 346 will engage, thus effecting a driving connection between the gears 347 and 349.

After this sequence of events has occurred the sector 320 will be reset or recocked in the following manner: A pin 375 is fixed to and projects from the other face of the driving gear 347 but normally clears the lever 327. When, however, the sector 320 has been rotated counterclockwise in the manner described above the lever or arm 327 will, of course, be rocked in a clockwise direction through the action of gears 324 and 325 so as to lie in the path of the pin 375. This pin will, therefore, at an appropriate instant in the cycle of operation of the impression roller, strike the arm 327 and will rock it counter-clockwise and the sector 320 clockwise. The bell crank lever 321 will meanwhile have been riding on the upper edge of the sector 320 and will drop into the notch 319 and will hold the sector in the cocked position shown in Figure 4. Meanwhile, of course, the upper end of slot 335 and link 328 will be cleared of the pin 366. Accordingly the weaker spring 343 will be free to rock the lever 337 and the post 345 in a counter-clockwise direction so that the latter will engage the notch 346a and disengage the clutch 346 so as to disrupt the driving connection between the gears 347 and 349. This will be accomplished at a predetermined point in the cycle of operation of the impression cylinder 46.

The cam shaft 356, as stated hereinabove, operates a kick-out or time delay cam assembly 357 which is illustrated in Figure 10.

Referring now to Fig. 10 and also to Figs. 11 and 12, a first kick-out cam 385 and a second kick-out cam 386 are provided for the purpose of actuating the first numbering reel 39a and the second numbering reel 39b, respectively. A cam 387 is also provided for kicking out the notching assembly in timed relationship to inactivation of the numbering heads. As shown, the cams 385, 386 and 387 are formed with axial bores 388 and they are all keyed to the cam shaft 356 (see Fig. 4). The first and second numbering reel kick-out cams 385 and 386 are each formed with an annular cam groove 389 having a high dwell 390, a low dwell 391, a rise 392 and a recede 393. The notching assembly kick-out cam 387 is formed with an annular cam groove 394 having a high dwell 395, a low dwell 396, a rise 397 and a recede 398. A cam follower roller 405 is provided which is rotatably mounted at one end of a lever 406 and which rides in the cam groove 389 of the cam 385. The other end of the lever 406 is formed with a passage 407 to receive a solid shaft 408 to which it is pinned as shown in Fig. 12. A similar roller 409 is rotatably mounted at one end of a lever 410 to ride in the cam groove 389 of cam 386, and the other end of the lever 410 is similarly formed with a passage 411 to receive a hollow shaft 412 to which it is keyed as shown in Fig. 12. As there shown, the shafts 408 and 412 are concentric and they extend through and are journaled in a side plate of the machine. On the opposite or works side of the side plate the solid shaft is pinned to a lever 413 which is pivotally connected at 414 to an adjustable link 415, the other end of which is pivotally connected at 416 to a lever 417 which is mounted on the shaft 54a which carries the cam 53a employed to operate the first numbering reel 39a. As is also shown in Fig. 11, a gear 418 is fixed to the shaft 54a and meshes with a sector gear 419 which is integral with an eccentric strap 420 clamped to the first numbering shaft 49a.

Similarly, a lever 421 is pinned to the hollow shaft 412 at one end and at its other end it is pivotally connected at 422 to an adjustable link 423, the other end of which is pivotally connected at 424 to a lever 425. The lever 425 is keyed to the shaft 54b on which the cam 53b is keyed which operates the second numbering head 39b. Similarly, a gear 426 is fixed to the shaft 49b and meshes with a sector gear 427 which is integral with an eccentric strap 428 clamped to the second numbering shaft 54b.

The operation of the kick-out cam assembly 357 as thus far described is as follows: With the cams 385 and 386 and their followers 405 and 409, respectively, in the relative positions shown in Fig. 10, the cams 53a and 53b (see Fig. 4) will be held in the positions there shown for actuating the tumblers 50 of the numbering reels. When, however, the solenoid 310 is actuated to engage the clutch 346, the cam shaft 356 will be rotated through the medium of the pinion 350 (see Fig. 39), driving gear 347, clutch 346, driven gear 349, and gear 355, in the manner explained hereinabove. At a predetermined and precisely calculated instant in the cycle of operation of the impression cylinder 46 the roller 405 will ride up the rise 392 of cam 385 and will thereby rotate the solid shaft 408 and through the medium of the lever 413, rod 415, and lever 417, will rotate the shaft 54a to rock the actuator cam 53a in a clockwise direction, as viewed in Fig. 4, so as to clear the followers 52 of the first numbering reel 39a. Simultaneously, gear 418 on shaft 54a will rotate sector gear 419 and the eccentric strap 420 to rock the first numbering shaft 49a in a clockwise direction, as viewed in Fig. 4, thereby causing the first numbering reel 39a to clear the web 11 and the impression cylinder 46.

It will be seen from an inspection of Fig. 10 that there is an angular displacement between the grooves 389 of the cams 385 and 386. The cam 386 goes through the same cycle as the cam 385, but by reason of the angular displacement above noted, it inactivates the second numbering reel 39b after the first numbering reel has been inactivated. This angular displacement, hence also the length of delay, are such in relation to the length of web between the two numbering reels, that the second reel is inactivated, when, and only when, it has numbered the last card numbered by the first reel.

It will be understood, of course, that as many numbering reels and as many individual operating parts therefor are provided, as there are rows of cards across the web.

As mentioned above, the cam 387 operates a kickout mechanism for the notching assembly, the purpose of which is as follows: The linear distance along the web between the second numbering head and the notching station corresponds to ten cards. It is desired to notch every card that has been numbered at the numbering station and in exact correspondence to the printed numbers. It is therefore desirable to continue the progressive notching of the cards along the web after the numbering assembly has been inactivated, and it is also desirable to then terminate further progression of the notching punches so that the numbering and notching assemblies always remain in exact correspondence, allowing, of course, for the ten card differential. These objects are accomplished in the following manner:

Referring again to Fig. 10, a cam follower roller 435 rides in the cam groove 394 of cam 387 and it is rotatably mounted on one end of a lever 436 which has a passage 437 formed in its other end to receive a kick-out shaft 438 (see Fig. 3) to which the lever is clamped. The kick-out shaft 438 which is journaled in the frame of the machine is rotatably connected on the works side of the machine to a rod 439 which extends upwardly and is rotatably connected to one end of a lever 440. The other end of the lever 440 is clamped to a shaft 441 journaled in a bracket 442. The other end of the shaft 441 is fixed to a lever 443 which is rotatably connected to one end of the rod 200 which, as shown in Fig. 20 and as explained above, operates a kick-out lever 194, a shaft 196 and a pawl 197 which is engageable with a notch 198 in the actuator pawl 189. When this occurs the pawl 189 is held in fixed position so that the notching assembly, although it continues to notch the web, remains in exact correspondence with the numbering assembly allowing for the ten card delay above-mentioned.

The shuttle mechanism

The shuttle mechanism is disclosed and claimed in the copending application of Orville V. Dutro, Serial No. 180,831, filed August 22, 1950, and entitled Shuttle Mechanism. As stated hereinbefore, a shuttle mechanism 12 is provided, the purpose and operation of which are as follows:

The web 11 is, of course, fed continuously and rapidly through the machine. It is important that the marginal perforations in the cards be accurately located and that the notching be also accurate. To achieve this object the shuttle mechanism 12 is provided, which operates to hold the web stationary at the perforating and notching stations during the instant of perforation and notching. Both of these operations are carried out simultaneously.

Referring now to Figs. 1 and 14, a shuttle drive mechanism 450 is provided comprising a shuttle drive cam 451 fixed to a shaft 452 journaled in the side plates of the machine. The cam 451 actuates follower rollers 453 which are fixed to a slide plate 455 which is slidable in guides 456 bolted to the frame of the machine. One end of the slide plate 455 is connected to a link 457 and the other end of which is connected to a lever 458 which is keyed to a shaft 459 journaled in the frame of the machine. The other end of the lever 458 is pivotally connected at 460 to one end of a link 461 the other end of which is pivotally connected to an upright post 462 which is fixed to a longitudinal horizontal slide bar 463 which is slidably supported by guides 464 bolted to the frame of the machine. The driven shuttle roller 69b (see Fig. 17) is carried by a shaft 465 which is journaled in the posts 462. The corresponding shuttle roller 69a at the other end of the machine is exactly similar in structure and mounting to the driven shuttle roller 69b just described. As shown in Figs. 18 and 19, the stationary shuttle rollers 68a and 68b, which are identical with one another, are mounted on shafts 470 journaled in the side plates of the machine and they are provided with frictional facings 471. The center guide roller 70, as shown in Fig. 19, is carried by a shaft 471 which is journaled in bearings fixed to the side plates of the machine.

The shuttle drive cam 451 is so designed, and is driven by means hereinafter described at such a rate in relation to the speed of the web through the press, that at the instant of perforating and notching, the web is fed rearwardly by the shuttle mechanism at the same rate that it is fed forwardly by the conveyor roller 41. Therefore at this critical instant the web is held stationary at the perforating and notching stations and accurate perforating and notching are accomplished. The web is then fed forwardly by the shuttle mechanism at an accelerated rate to "catch up" with its normal rate of forward travel through the machine.

During oscillation of the web at the piercing and notching stations means must be provided to prevent development of abnormal tension or slack in the web. Thus, referring to Fig. 1, as the shuttle mechanism 12 moves to the left the center-to-center distance between the shuttle rollers 68a and 69a increases while the center-to-center distance between the shuttle rollers 68b and 69b decreases. The opposite conditions exist on return movement of the shuttle.

To provide against the possibility of abnormal tension or slack in the web and to co-operate with the shuttle drive cam 451, a chain and sprocket drive is provided for the shuttle rollers as illustrated in Fig. 16.

Referring now to Fig. 16, an endless chain 474 is provided which is led over a sprocket 475 fixed to the shaft 470a of guide roller 68a, a sprocket 476 fixed to the shaft 465a of the left-hand shuttle roller 69a, a sprocket 477 fixed to the shaft 471 of shuttle guide roller 70, a sprocket 478 fixed to the shaft 465b of the right-hand shuttle roller 69b an a sprocket 479 fixed to the shaft 470b of the right-hand shuttle guide roller 68b. The chain is also led over a sprocket 480 fixed to a shaft 485 journaled in the frame of the machine, a take-up sprocket 486 fixed to a shaft 487 journaled in an adjustable bracket 488, and, finally, over a drive sprocket 489 fixed to a shaft 490 journaled in the frame of the machine.

In Fig. 16 this roller drive compensating mechanism is viewed as it would be seen looking out from the side plate 45a on the gear side of the machine. On the inside of the side plate 45a and fixed to the shaft 490 is a drive sprocket 491 which is driven by a chain 492 and a sprocket 493 fixed to the shaft 494 of the impression roller 46. (See Fig. 3.) The sprockets 475, 476, 477, 478, 479, 480, 486, 489 and 491 are identical with one another and the ratio between the sprocket 491 and the sprocket 493 is such that the chain 474 is driven at the linear speed of the web.

It will be apparent that when the shuttle mechanism 12 shifts from right to left, the sprockets 476, 477 and 478 will be rotated in a clockwise direction by travel of the chain at a peripheral speed equal to the speed of the web to the press. However, these sprockets also roll on the chain 474 at a linear speed which is determined by the speed and design of the shuttle drive cam 451. This imparts to the sprockets 476, 477 and 488, hence also to the shuttle rollers 69a, 70 and 69b, a counter-clockwise rotation opposing the clockwise component. At the critical instant of punching, these components are equal, hence the rollers 69a, 70 and 69b are motionless. Hence the web is absolutely motionless at the piercing and notching stations. On return of the shuttle, these components are in the same direction and will therefore add. Consequently, the rollers 69a, 70 and 69b are accelerated to feed the web forwardly at an accelerated rate.

The driving means and transmission

The driving means and transmission for operating the machine and timing the various parts thereof are shown in Figs. 39 and 40. Referring first to Fig. 39, the machine is driven by a main drive shaft 500. This shaft may be driven from a printing press (not shown) for printing the web 11 in timed relation thereto, thus synchronizing the machine of the present invention with operation of a printing press.

The main drive shaft 500, as illustrated, has a bevel gear 501 meshing with a bevel gear 502 fixed to a shaft 503 journalled in the frame of the machine. A pinion 504 fixed to the shaft 503 meshes with gears 505 and 506 which are fixed to the crankshaft 81 of the notching assembly and the crankshaft 75 of the piercing assembly, respectively. A sprocket 507 is fixed to the crankshaft 75 of the piercing assembly and an endless chain 508 is led over the sprocket 507 and also over a sprocket 509 fixed to the shaft 351 which is also shown in Fig. 4 as carrying the pinion 350 which drives the kick-out mechanism. As illustrated in Fig. 39 and also in Fig. 4, the pinion 350 meshes with the driving gear 347 which is connected by means of a clutch 346 to the driven gear 349 which meshes with the gear 355 on cam shaft 356. A gear 510 is also fixed to the shaft 351 and meshes with an idler gear 511 which in turn meshes with a gear 512 fixed to a shaft 513 which mounts the driven conveyor roller 41.

In a typical instance the main drive shaft 500 will be driven at a rate to drive the shaft 351 and the conveyor roller 41 at 60 R. P. M. Accordingly, as explained above, the cam shaft 356 and the kick-out cam assembly 357 will be driven at the rate of 6 R. P. M.

The gear 510 also meshes with a gear 514 of the same pitch diameter and which is fixed to the shaft 494 which mounts the impression roller 46. Thus the impression roller 46 will be driven at the rate of 60 R. P. M. As described hereinabove, the shaft 494 of the impression roller 46 also drives the shuttle roller compensating mechanism through the medium of the sprocket 493 fixed to the shaft 494, an endless chain 492 and the sprocket 491.

The gear 514 also meshes with gears 520 and 521 which are fixed to the first and second numbering shafts 49a and 49b respectively and thus serves to drive the first and second numbering reels 39a and 39b. A sprocket 522 is fixed to the shaft 49b and an endless chain 523 is led over the sprocket 522 and over a sprocket 524 which is fixed to a shaft 525 which mounts the ink fountain roller 59. The gear 521 also meshes with an idler gear 526 which in turn meshes with a gear 527 mounted on a shaft 528 which carries the vibrator roller 63. It will be apparent that, inasmuch as the gears 520 and 521 driving the first and second numbering reels have the same pitch diameter as the gears 514 and 510, that they will also be driven at the rate of 60 R. P. M.

Referring now to Fig. 40, a gear 535 is fixed to the crankshaft 81 of the notching assembly and this gear meshes with an idler gear 536 fixed to a shaft 537 journaled in the frame of the machine. The idler 536 meshes with a shuttle drive gear 538 which is fixed to the shaft 452 on which the shuttle drive cam 451 is mounted. A gear 539 is also mounted on the shaft 452 and meshes with an idler gear 541 which in turn meshes with a gear 542 mounted on a shaft 543 journaled in the frame of the machine. A gear 544 is also fixed to the shaft 543 and meshes with a gear 545 mounted on a shaft 546 which carries the cross perforator roller 235. The gear 545 also meshes with a gear 547 which meshes with a gear 548 driving the anvil roller 231 which cooperates with the longitudinal perforator roller 232 and the gear 548 meshes with an idler 549 which meshes with a gear 550 which drives the conveyor roller 227. The gear 547 also meshes with a gear 555 which drives an idler gear 567 which in turn drives a gear 557 which drives the scrap roller 246.

The gear 544 meshes with a gear 558 which in turn meshes with a gear 559 mounted on a shaft 560 journaled in the frame of the machine. The gear 559 meshes with a gear 562 fixed to the shaft 262 which mounts the shear assembly 257 for longitudinal slitting and trimming of the web. A gear 563 fixed to the shaft 560 meshes with a gear 564 which in turn meshes with a gear 565 which is fixed to a shaft 566 which mounts the cross-cutter 237.

It will thus be apparent that a machine is provided which is capable of carrying out a multiplicity of operations in precisely timed relationship. Thus a web can be fed continuously and rapidly to the machine which is printed with cards of the character described including marginal fields. These cards are printed with consecutive numbers both in a transverse and a longitudinal direction. Means are provided for inactivating the numbering reels in succession so that each card is numbered transversely and longitudinally or not at all.

Means are also provided for punching the cards to form marginal perforations and for notching the cards. The notching is carried out so as to code each card in accordance with the number printed thereon. Thus a batch of cards may be run through the machine and each card in the batch may be printed and notched with an individual identifying number.

Means are provided also for stopping the notching assembly in timed relationship to stoppage of the numbering assembly such that every card which is numbered by the numbering assembly is correspondingly notched by the notching assembly and such that the numbering and notching assemblies are at all times maintained in a predetermined relationship.

Moreover, means are provided for stopping the web at the piercing and notching stations during the critical moment of punching so that accurate piercing and notching are achieved.

Also an assembly is provided for producing cross perforations and marginal perforations, for slitting the web longitudinally to trim it precisely to the desired final dimensions of the card, and for cutting the web transversely into individual cards.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. A machine of the character described, comprising a printing station having a first rotary printing means and a second rotary printing means arranged to successively print on a moving web, a punching station having punching means for punching through the web, rotary operating means adapted to receive the web from the punching station and perform an operation on the web while the web is moving, means for continuously feeding a web through the printing station to and through the punching station in an intermittent advancing manner and then continuing through said rotary operating means, and means for inactivating the first rotary printing means and then, after a predetermined lapse of time, inactivating the second rotary printing means, and then after a further predetermined lapse of time, inactivating the punching means.

2. A machine of the character described, comprising a printing station having a first rotary printing means and a second rotary printing means arranged to successively print on a moving web, a punching station having a punching means for punching through the web, rotary cutting means adapted to receive the web from the punching station and perform a cutting operation thereon while the web is moving, means for continuously feeding a web through the printing station to and through the punching station in an intermittent advancing manner and then continuously through said rotary cutting means, and means for inactivating the first rotary printing means, and then after a predetermined lapse of time, inactivating the second rotary printing means, and then after a further predetermined lapse of time, inactivating the punching means.

3. A machine of the character described, comprising a printing station having a first rotary printing means and a second rotary printing means arranged to successively print on a moving web, rotary cutting means, a punching station having a bodily stationary reciprocable punching means for punching through the web, rotary cutting means adapted to receive the web from the punching station and perform a cutting operation thereon while the web is moving, means for continuously feeding a web through the printing station to and through the punching station in an intermittent advancing manner, and then continuously through said rotary operating means, and means for inactivating the first rotary printing means and then, after a predetermined lapse of time, inactive the second rotary printing means, and then, after a further predetermined lapse of time, inactivate the punching means.

4. A machine of the character described comprising a printing assembly adapted to print numbers on a web continuously fed thereto and a notching assembly adapted to notch the web to correspond with the printed numbers; said printing assembly including a rotatable impression cylinder over which the web is led and an eccentrically mounted rotatable printing reel adapted to print numbers on the web as it is fed over the impression cylinder; said notching assembly including a plurality of punches and means for sequentially activating the punches; time delay means operable to automatically pivot the printing head away from the impression cylinder and to interrupt the sequential activation of the punches, said time delay means comprising rotatable driving and driven members, means for rotating the driving member continuously during rotation of the impression cylinder, a clutch providing a driving connection between the driving and driven members, means normally disengaging the clutch, means for operating the clutch disengaging means to engage the clutch, said clutch engaging means comprising dual controls, both of which must be actuated to engage the clutch, means for so actuating one of said controls periodically at a predetermined point in the cycle of operatiton of the impression cylinders, the other control being operable independently of the impression cylinder, and means for automatically again moving the clutch disengaging means back to its normal position.

5. A machine of the character described comprising a printing assembly adapted to print numbers on a web continuously fed thereto and a notching assembly adapted to notch the web to correspond with the printed numbers; said printing assembly including a rotatable impression cylinder over which the web is led and an eccentrically mounted rotatable printing reel adapted to print numbers on the web as it is fed over the impression cylinder; said notching assembly including a plurality of punches and means for sequentially activating the punches; time delay means operable to automatically pivot the printing head away from the impression cylinder and to interrupt the sequential activation of the punches, said time delay means comprising rotatable driving and driven members, means for rotating the driving member continuously during rotation of the impression cylinder, a clutch providing a driving connection between the driving and driven members, means normally disengaging the clutch, means for operating the clutch disengaging means to engage the clutch, said clutch engaging means comprising dual controls, both of which must be actuated to engage the clutch, means for so actuating one of said controls periodically at a predetermined point in the cycle of operation of the impression cylinders, the other control being operable independently of the impression cylinder, and means operated by operation of the clutch for again moving the clutch disengaging means back to its normal position.

6. A machine of the character described comprising a printing assembly adapted to print numbers on a web continuously fed thereto and a notching assembly adapted to notch the web to correspond with the printed numbers; said printing assembly including a rotatable impression cylinder over which the web is led and an eccentrically mounted rotatable printing reel adapted to print numbers on the web as it is fed over the impression cylinder; said notching assembly including a plurality of punches and means for sequentially activating the punches; time delay means operable to automatically pivot the printing head away from the impression cylinder and to interrupt the sequential activation of the punches, said time delay means comprising rotatable driving and driven members, means for rotating the driving member continuously during rotation of the impression cylinder, a clutch providing a driving connection between the driving and driven members, means normally disengaging the clutch, means for operating the clutch disengaging means to engage the clutch, said clutch engaging means comprising dual controls, both of which must be actuated to engage the clutch, means for so actuating one of said controls periodically at a predetermined point in the cycle of operation of the impression cylinders, the other control being operable independently of the impression cylinder, and means operable by operation of the clutch for again moving the clutch disengaging means back to its normal position, including a member carried by the continuously driven member engageable with a pivotal member controlled by the controls and forming a part of the clutch disengaging means.

7. A machine of the character described comprising a printing assembly adapted to print numbers on a web continuously fed thereto and a notching assembly adapted to notch the web to correspond with the printed numbers; said printing assembly including a rotatable impression cylinder over which the web is led and an eccentrically mounted rotatable printing reel adapted to print numbers on the web as it is fed over the impression cylinder; said notching assembly including a plurality of punches and means for sequentially activating the punches; time delay means operable to automatically pivot the printing head away from the impression cylinder and to interrupt the sequential activation of the punches, said time delay means comprising rotatable driving and driven members, means for rotating the driving member continuously during rotation of the impression cylinder, a clutch providing a driving connection between the driving and driven members, means normally disengaging the clutch, means for operating the clutch disengaging means to engage the clutch, said clutch engaging means comprising dual controls, both of which must be actuated to engage the clutch, means for so actuating one of said controls periodically at a predetermined point in the cycle of operation of the impression cylinders, the other control being operable independently of the impression cylinder, and means operable by operation of the clutch for again moving the clutch disengaging means back to its normal position, including a member carried by the continuously driven member of the clutch engageable with a pivotal member engageable with the controls to be controlled thereby and forming a part of the clutch disengaging means.

8. A machine of the character described comprising a printing assembly adapted to print numbers on a web continuously fed thereto and a notching assembly adapted to notch the web to correspond with the printed numbers; said printing assembly including a rotatable impression cylinder over which the web is led and an eccentrically mounted rotatable printing reel adapted to print members on the web as it is fed over the impression cylinder; said notching assembly including a plurality of notching punches and means for sequentially activating the punches; and time delay means operable to automatically pivot the printing head away from the impression cylinder and to interrupt the sequential activation of the punches, said time delay means comprising rotatable driving and driven members, means for rotating the driving member continuously during rotation of the impression cylinder, a clutch providing a driving connection between the driving and driven members, means normally disengaging the clutch, means for operating the clutch disengaging means to engage the clutch, said clutch engaging means comprising dual controls both of which must be actuated to engage the clutch, means for so actuating one of said controls periodically at a predetermined point in the cycle of operation of the impression cylinders, the other control being operable independently of the impression cylinder.

9. A machine of the character described, comprising a continuously operating rotary printing means for printing a series of numerals in consecutive fashion on a moving web, intermittently operating punching means receiving the web from the printing means, spaced from the printing means, and operating in delayed timed relationship with respect to the printing means for punching openings in the web in consecutive fashion to code the web in a manner correlated to the numerals imprinted thereon and in associated relationship with respect thereto, continuously operating rotary cutting means receiving the moving web from the printing means and longitudinally slitting the moving web so as to open the coded openings punched in said web, means for continuously feeding the web through the printing means to and through the punching means in an intermittent advancing manner and then continuously through said rotary cutting means, and means for inactivating the printing means and then after a predetermined lapse of time inactivating the punching means.

10. A machine of the class described, comprising a first continuously operating printing means for serially printing numerals into consecutive fashion on a web, a second printing web spaced from the first printing means for serially printing correlated numerals in consecutive fashion on the web, and operating in delay timed relationship to the operation of the first printing means so that correlated numerals appear in associated relationship on the web, intermittently operating punching means receiving the web from the second printing means, spaced from the second printing means and operating in delayed timed relationship with respect to the second printing means for punching openings in the web in consecutive fashion to code the web in a manner correlated to the numerals imprinted thereon and in associated relationship with respect to said numerals, continuously operating rotary cutting means receiving the web from the punching means for longitudinally slitting the web so as to open the coded openings punched therein, means for continuously feeding a web through the first and second cutting means to and through the punching means in an intermittently advancing manner and then continuously through said rotary cutting means, and means for inactivating the first printing means, and means for inactivating the first printing means, and then after a predetermined lapse of time inactivating the second printing means, and then after a further predetermined lapse of time inactivating the punching means.

11. A machine of the character described, comprising a continuously operating rotary printing means for printing a series of numerals in consecutive fashion on a moving web, intermittently operating punching means receiving the web from the printing means, spaced from the printing means, and operating in delayed timed relationship with respect to the printing means for punching openings in the web in consecutive fashion to code the web in a manner correlated to the numerals imprinted thereon and in associated relationship with respect thereto, continuously operating rotary cutting means receiving the moving web from the printing means and longitudinally slitting the moving web so as to open the coded openings punched in said web, means for continuously feeding the web through the printing means to and through the punching means in an intermittent advancing manner and then continuously through said rotary cutting means, and means for inactivating the printing means and then after a predetermined lapse of time inactivating the punching means, the feeding means operating at a catch-up rate after each period of rest of the punching means so that the average velocity of the web through the punching means is the same as that through the printing means and the rotary cutting means.

12. A machine of the class described, comprising a first continuously operating printing means for serially printing numerals into consecutive fashion on a web, a second printing means spaced from the first printing means for serially printing correlated numerals in consecutive fashion on the web, and operating in delayed timed relationship to the operation of the first printing means so that correlated numerals appear in associated relationship on the web, intermittently operating punching means receiving the web from the second printing means, spaced from the second printing means and operating in delayed timed relationship with respect to the second printing means for punching openings in the web in consecutive fashion to code the web in a manner correlated to the numerals imprinted thereon and in associated relationship with respect to said numerals, continuously operating rotary cutting means receiving the web from the punching means for longitudinally slitting the web so as to open the coded openings punched therein, means for continuously feeding a web through the first and second cutting means to and through the punching means in an intermittently advancing manner and then continuously through said rotary cutting means, and means for inactivating the first printing means, and then after a predetermined lapse of time inactivating the second printing means, and then after a further predetermined lapse of time inactivating the punching means, the feeding means operating at a catch-up rate at the punching means after each period of rest of the punching means so that the average velocity of the web through the punching means is the same as that through the printing means and the rotary cutting means.

ORVILLE V. DUTRO.
     LYLE V. DUTRO.
     JAMES F. NAMETH.

References Cited in the file of this patent

UNITED STATES PATENTS

| Number | Name | Date |
|---|---|---|
| 958,661 | Meisel | May 17, 1910 |
| 1,019,197 | Smith | Mar. 5, 1912 |
| 1,402,848 | Dutro et al. | Jan. 10, 1922 |
| 1,500,424 | Smith | July 8, 1924 |
| 1,502,128 | Smith | July 22, 1924 |
| 1,691,889 | Meisel | Nov. 13, 1928 |
| 1,905,446 | Dewey | Apr. 25, 1933 |
| 2,011,505 | Smith | Aug. 13, 1935 |
| 2,211,310 | Andrews | Aug. 13, 1940 |
| 2,521,435 | Wockenfuss | Sept. 5, 1950 |
| 2,531,873 | Daly | Nov. 28, 1950 |
| 2,548,136 | Auer | Apr. 10, 1951 |
| 2,578,700 | Harrold | Dec. 18, 1951 |

FOREIGN PATENTS

| Number | Country | Date |
|---|---|---|
| 1,501 | Great Britain | Jan. 20, 1911 |